(12) United States Patent
Richeux et al.

(10) Patent No.: US 8,382,539 B2
(45) Date of Patent: Feb. 26, 2013

(54) AMPHIBIOUS VEHICLE FOR BRIDGING A WATER-FILLED OPENING

(75) Inventors: Elisabeth Richeux, La Ciotat (FR); Henri Aubert, Sanary (FR)

(73) Assignee: Constructions Industrielles de la Mediterranee-CNIM, Paris (FR)

( * ) Notice: Subject to any disclaimer, the term of this patent is extended or adjusted under 35 U.S.C. 154(b) by 585 days.

(21) Appl. No.: 12/526,976

(22) PCT Filed: Feb. 2, 2007

(86) PCT No.: PCT/FR2007/000355
§ 371 (c)(1),
(2), (4) Date: Oct. 13, 2009

(87) PCT Pub. No.: WO2008/104644
PCT Pub. Date: Sep. 4, 2008

(65) Prior Publication Data
US 2010/0112876 A1    May 6, 2010

(51) Int. Cl.
*B60F 3/00* (2006.01)
*E01D 15/14* (2006.01)
*E01D 15/20* (2006.01)
*E01D 15/22* (2006.01)

(52) U.S. Cl. .............................. 440/12.5; 14/2.6; 14/27

(58) Field of Classification Search ........ 440/12.5–12.7; 14/2.6, 27–30
See application file for complete search history.

(56) References Cited

U.S. PATENT DOCUMENTS

| | | | |
|---|---|---|---|
| 3,021,544 A * | 2/1962 | Gehlen et al. ...................... 14/27 |
| 3,152,569 A * | 10/1964 | Gehlen et al. .................. 114/258 |
| 3,269,349 A * | 8/1966 | Gehlen ............................ 14/2.6 |
| 3,446,176 A * | 5/1969 | Long et al. ................. 440/12.54 |
| 3,613,139 A * | 10/1971 | Hansgen et al. .................. 14/2.6 |
| 3,628,490 A | 12/1971 | Gehlen |
| 3,643,618 A * | 2/1972 | Gehlen ............................ 14/2.6 |
| 3,978,812 A * | 9/1976 | Wagner ............................ 14/2.6 |
| 4,214,546 A | 7/1980 | Jochum et al. |
| 6,722,931 B2 * | 4/2004 | Eberl ........................... 440/12.5 |
| 7,690,957 B2 * | 4/2010 | Richeux et al. .............. 440/12.5 |
| 2003/0143900 A1 | 7/2003 | Eberl |

FOREIGN PATENT DOCUMENTS

| | | |
|---|---|---|
| DE | 1124383 A * | 2/1962 |
| DE | 32 04 473 A1 | 8/1983 |
| DE | 33 42 090 A1 | 5/1985 |
| DE | 3342088 A1 * | 5/1985 |
| GB | 1266288 | 5/1960 |
| GB | 2133354 A * | 7/1984 |

* cited by examiner

*Primary Examiner* — Ajay Vasudeva
(74) *Attorney, Agent, or Firm* — Leydig, Voit & Mayer, Ltd.

(57) ABSTRACT

An amphibious vehicle includes caissons, floats, and ramps stored on top of one another on a self-propelled rolling base, when the vehicle is in a folded configuration for driving over firm ground. The elements can be deployed transversely with respect to a longitudinal axis of the rolling base when the vehicle, alone or with another vehicle of the same design, forms a pontoon or a ferry to breach a water-filled opening. The vehicle includes a deployment device to deploy the elements on one side before beginning to deploy the elements on the other side of the rolling base. The elements are deployed in at least three different configurations. The elements on each side, include respectively, from the inside outwards, in the deployed configuration, a caisson, a float, and a ramp which are hinged together in a Z-configuration.

12 Claims, 26 Drawing Sheets

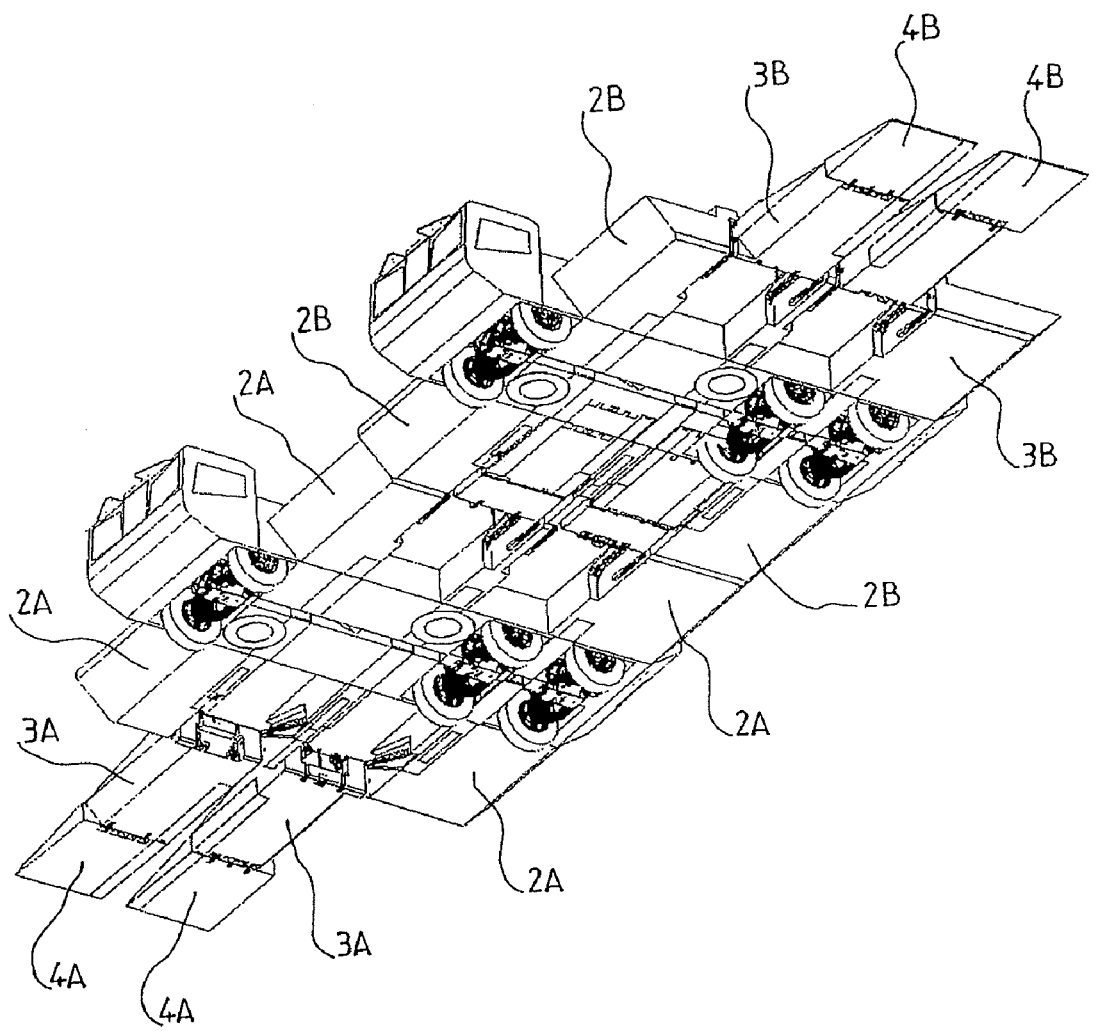

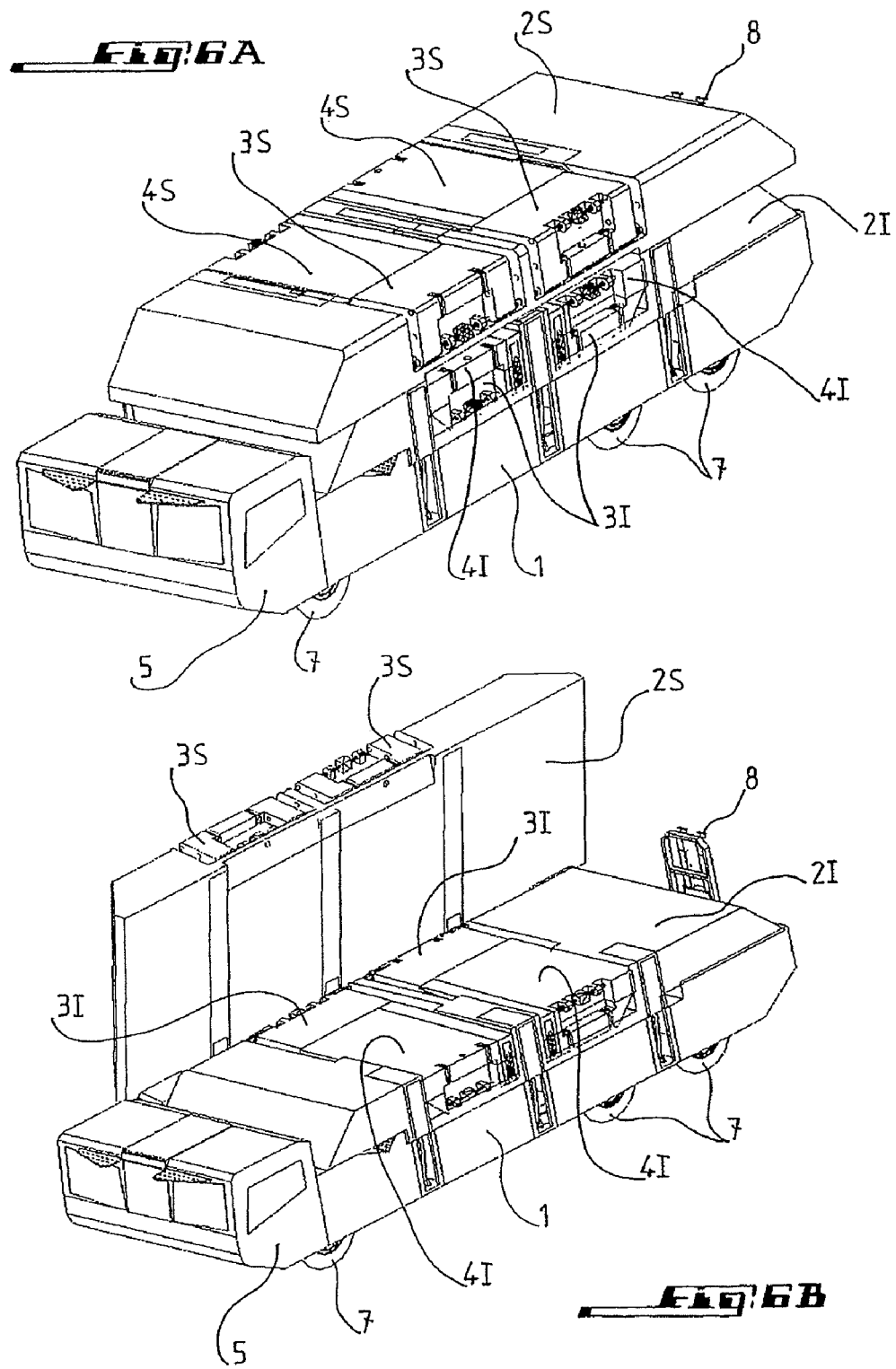

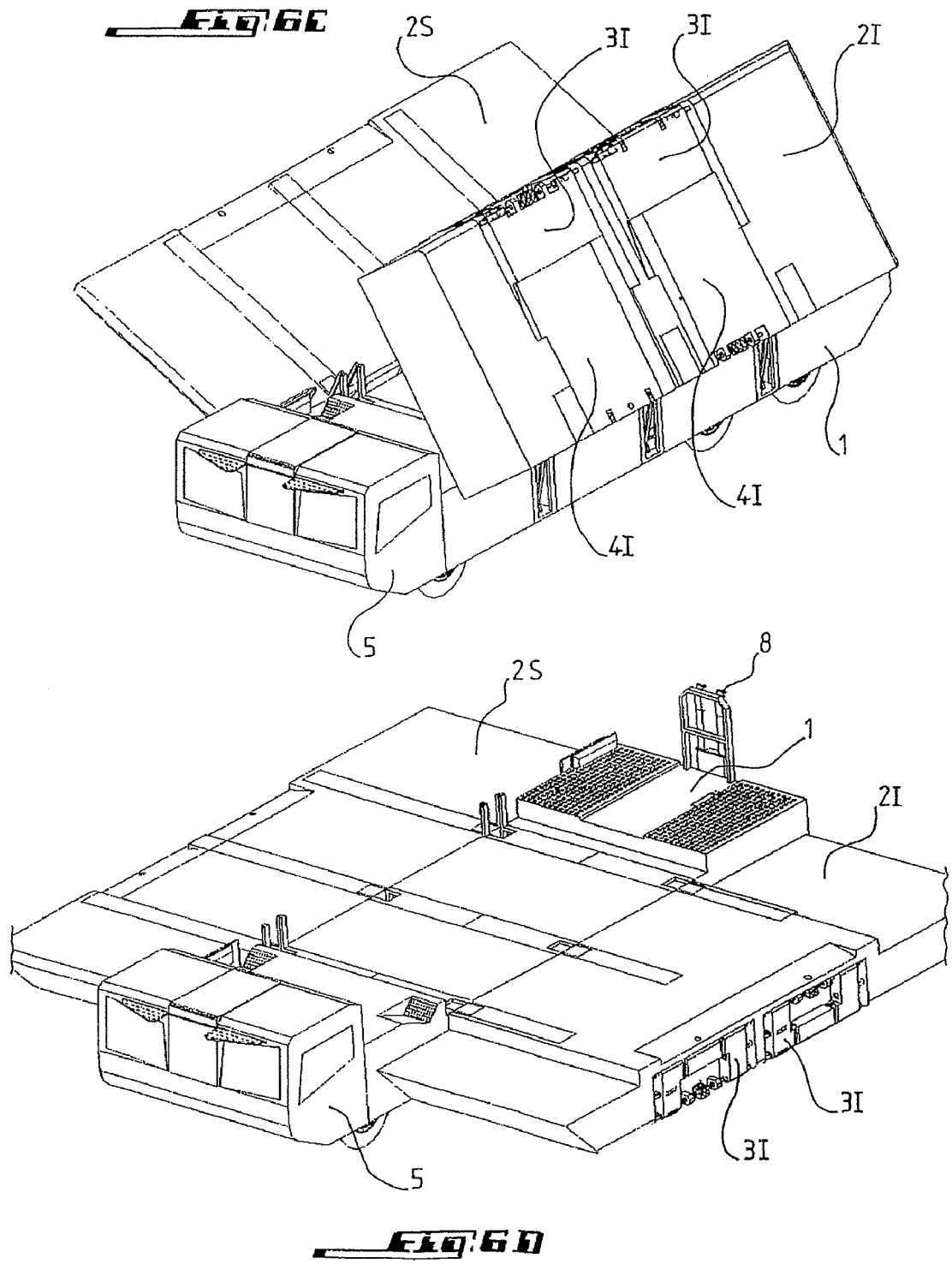

Figure 1:
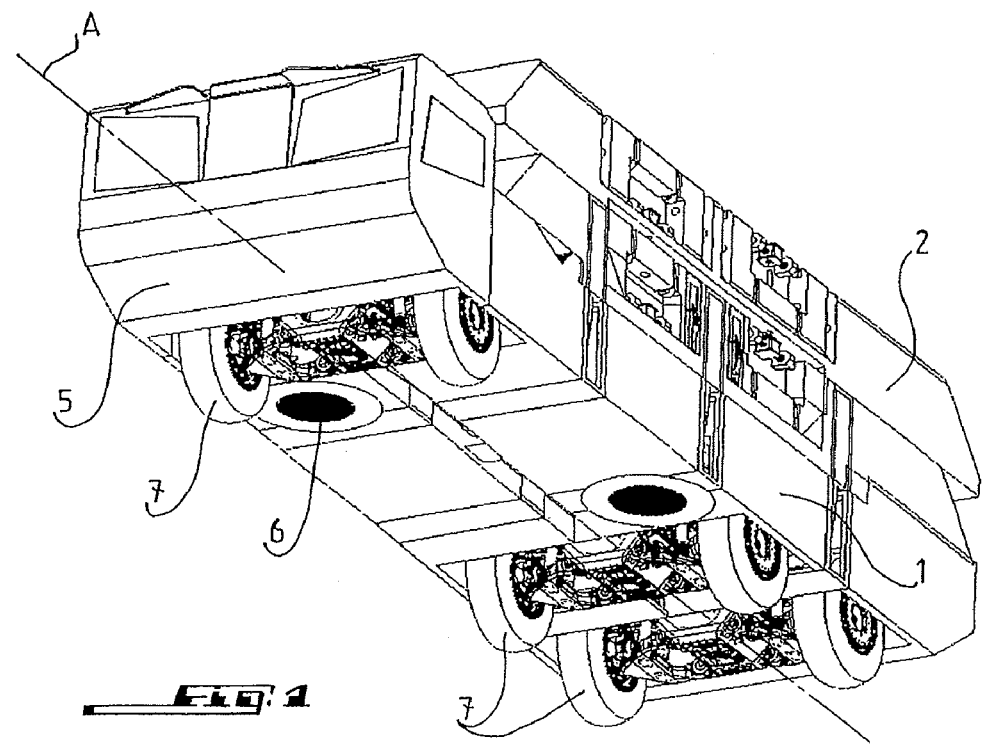

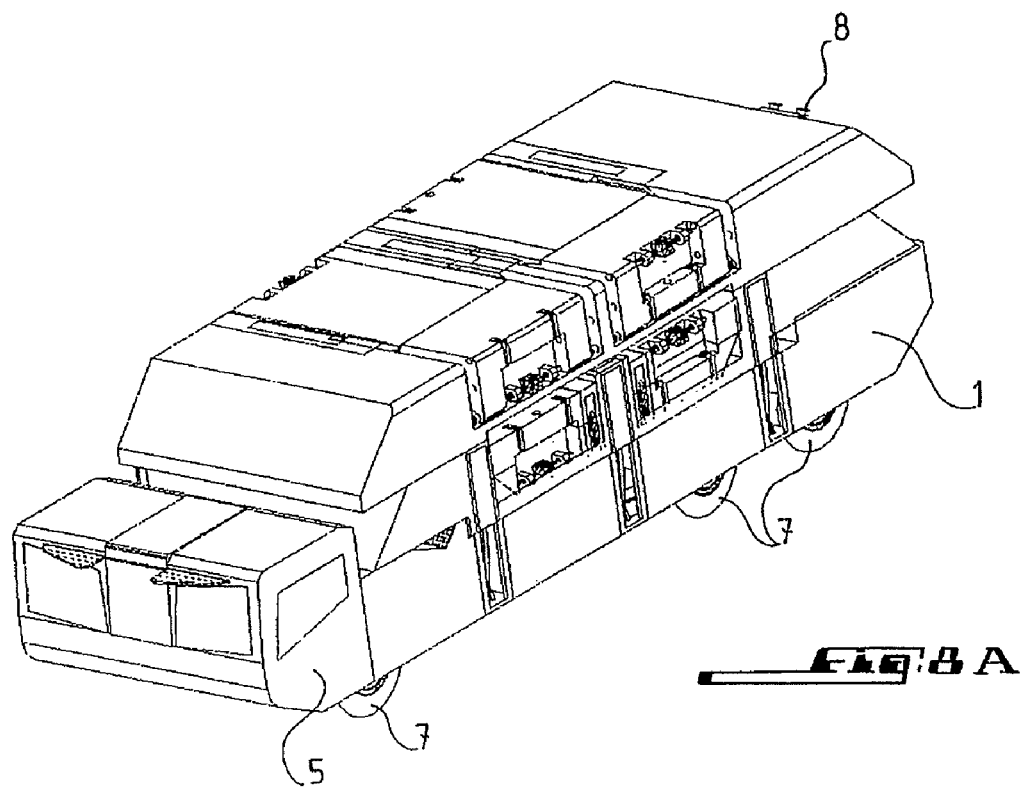
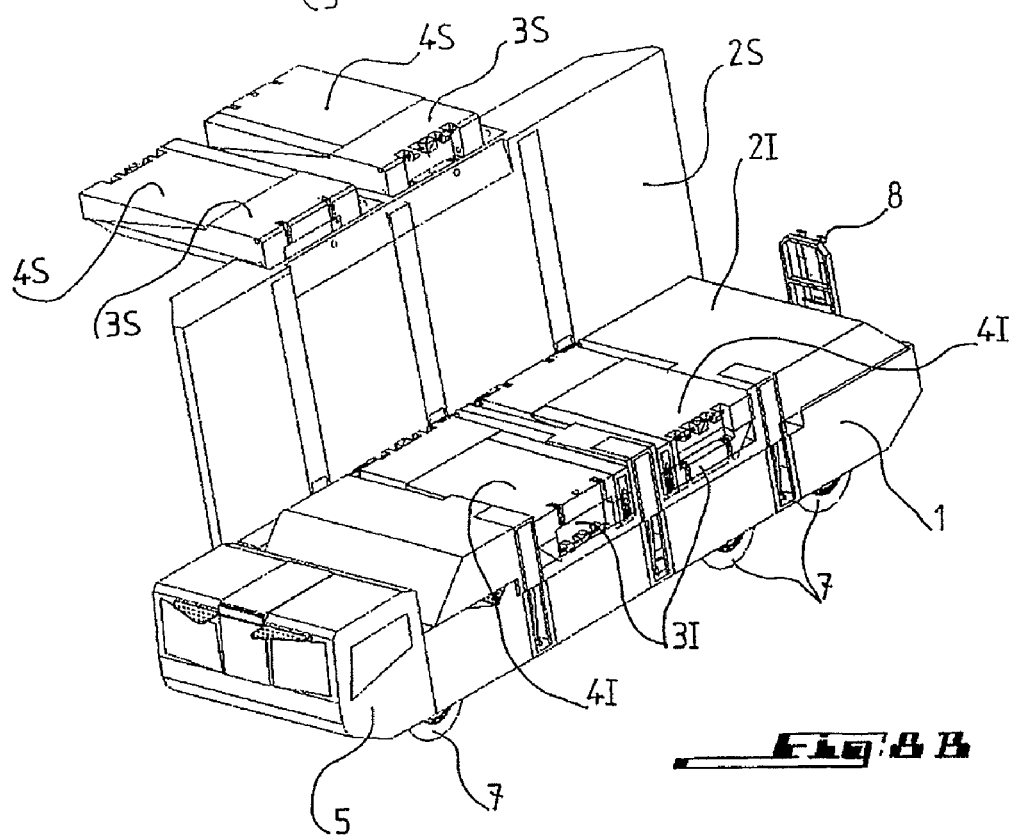

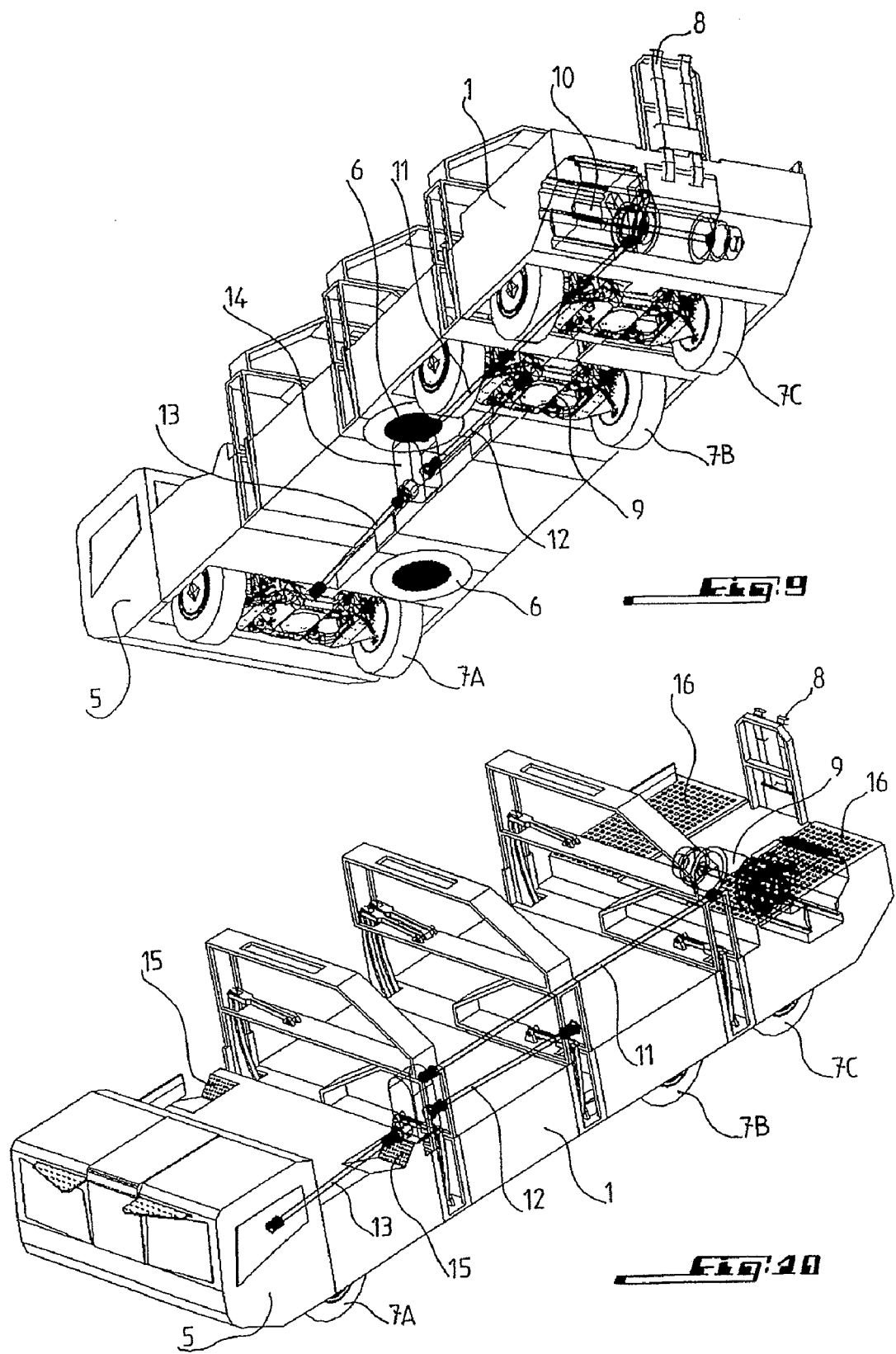

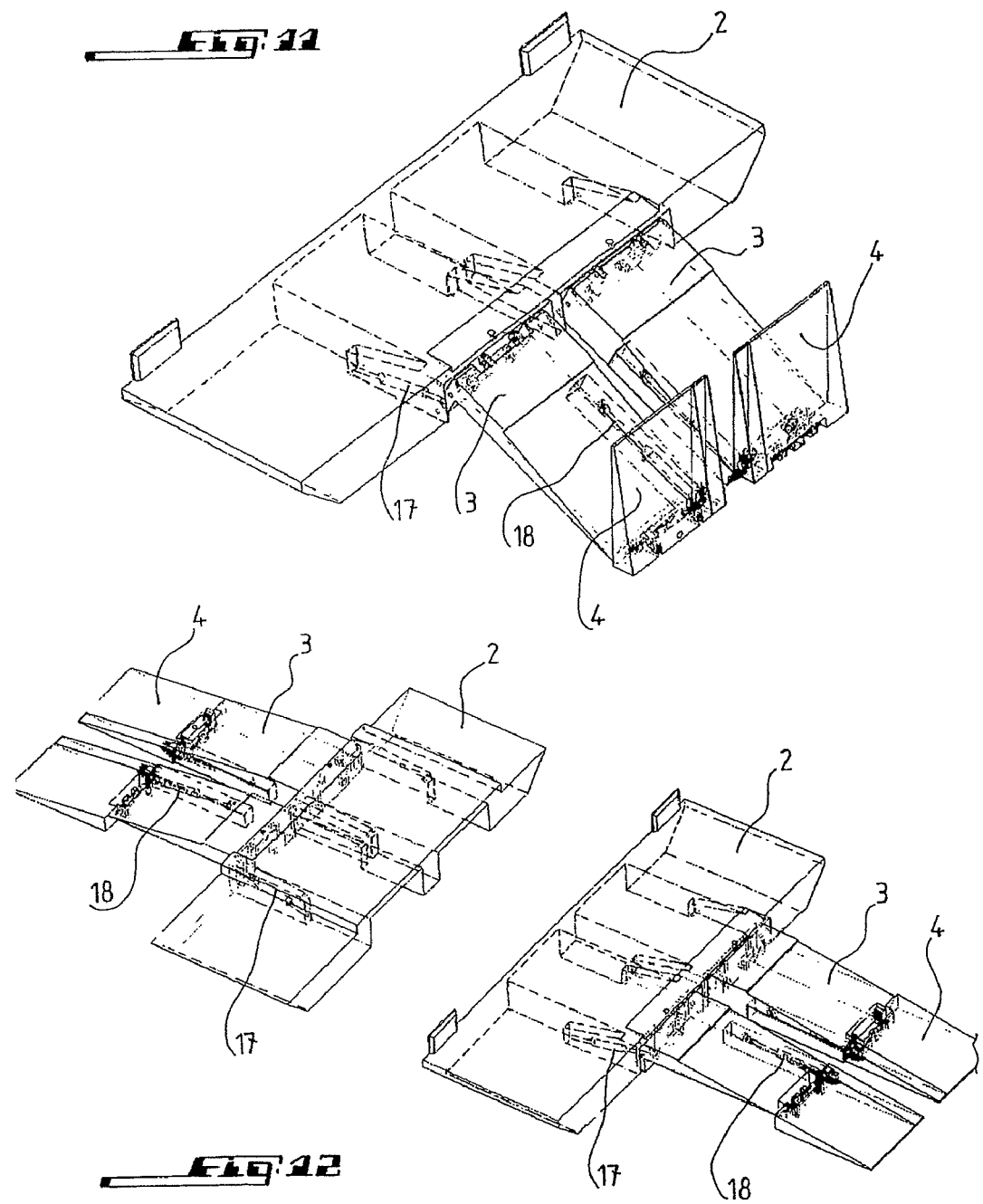

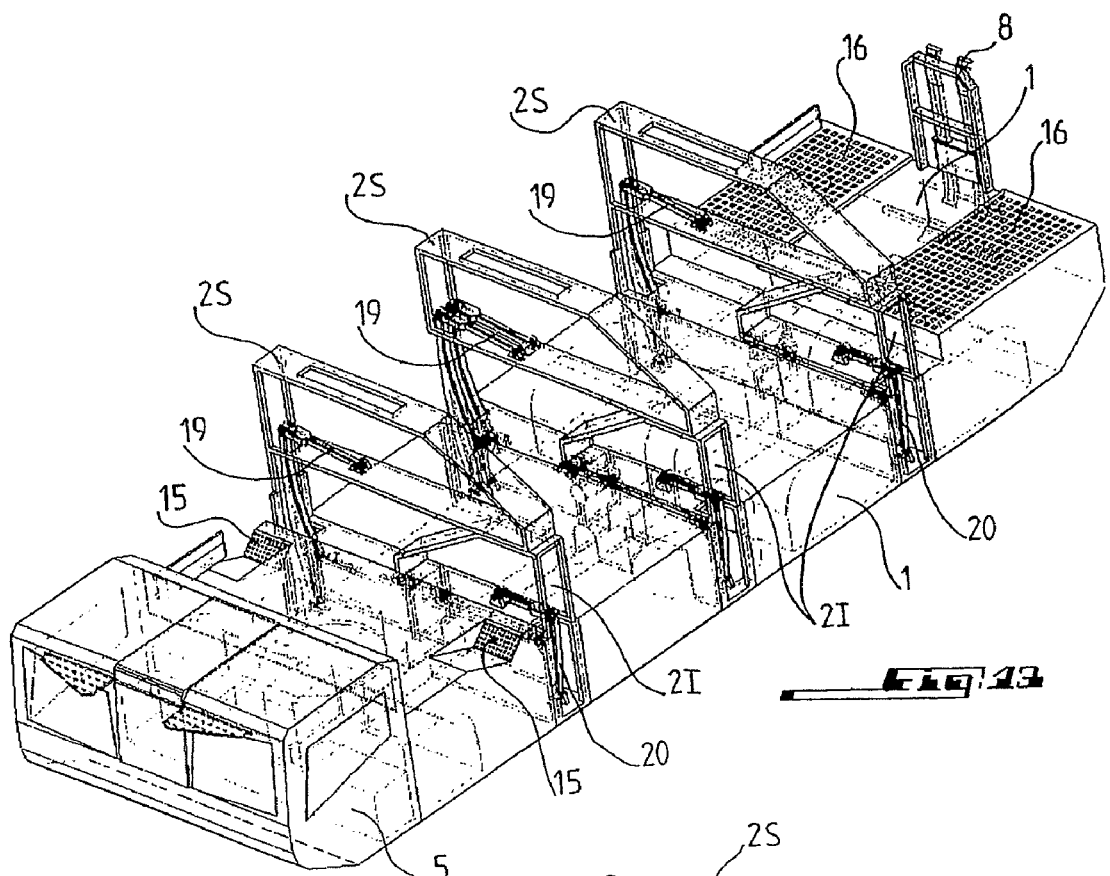
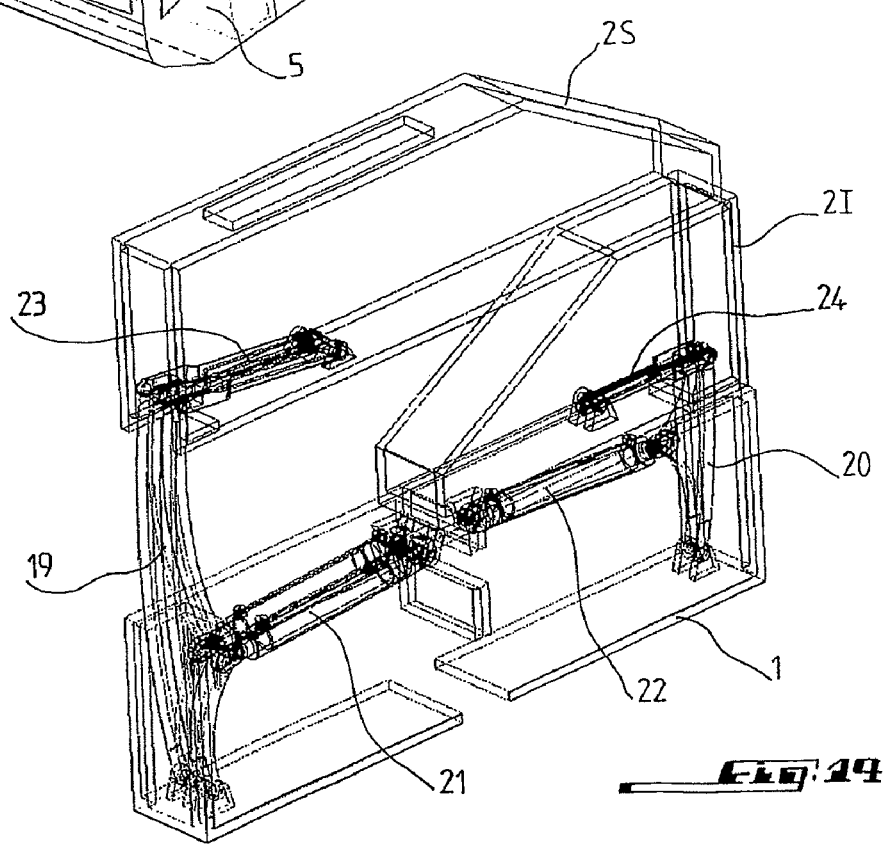

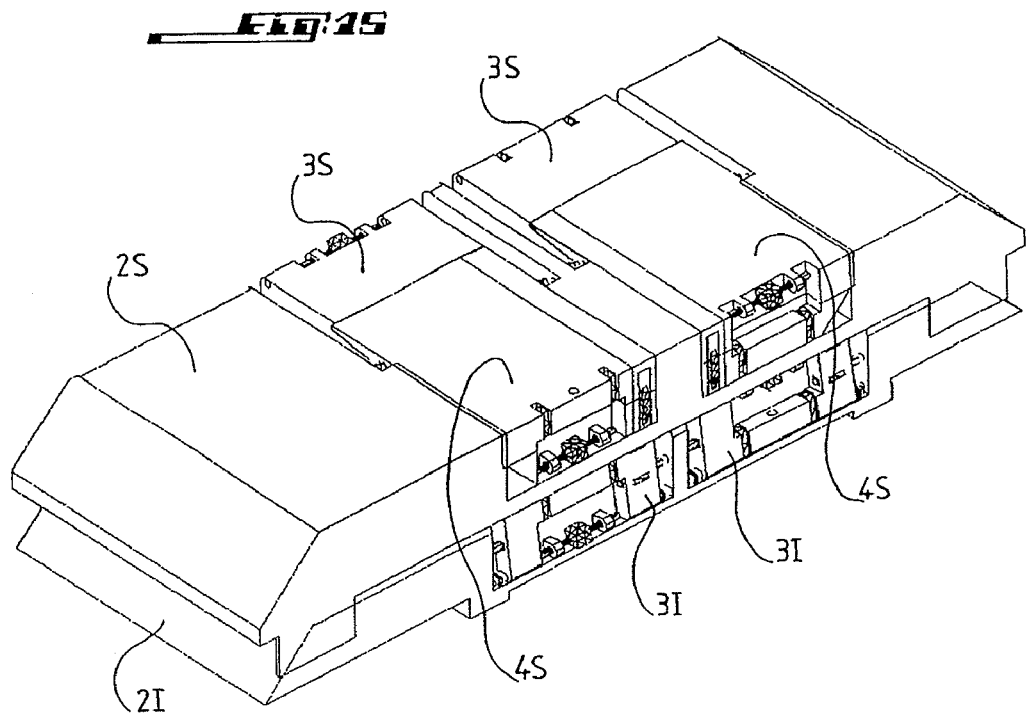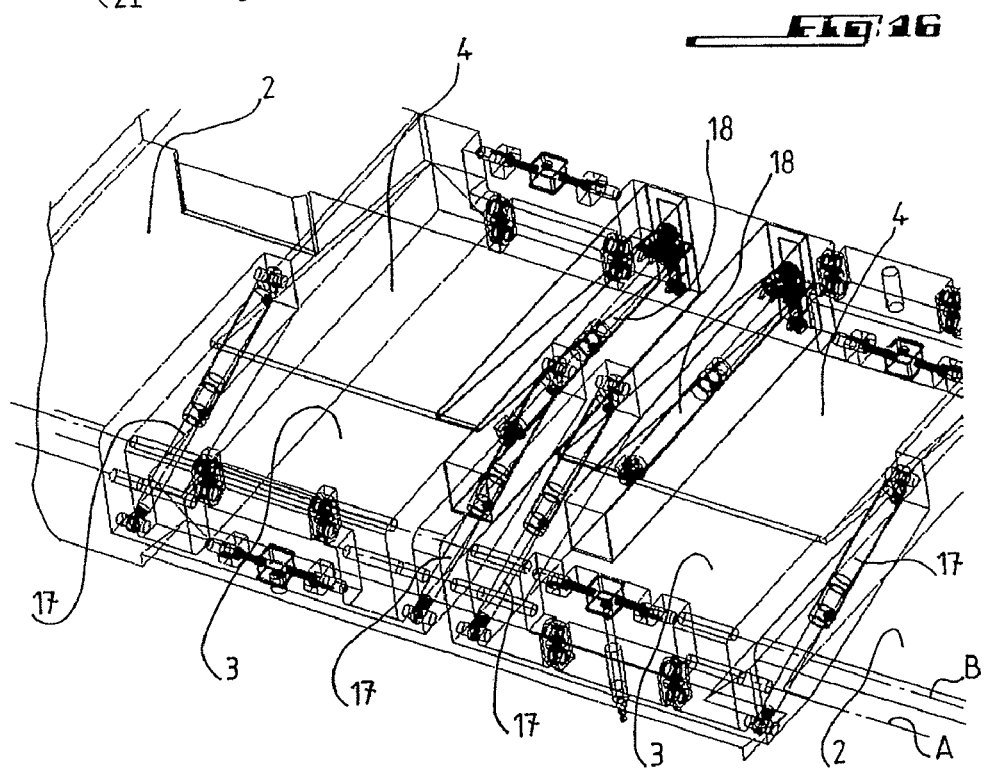

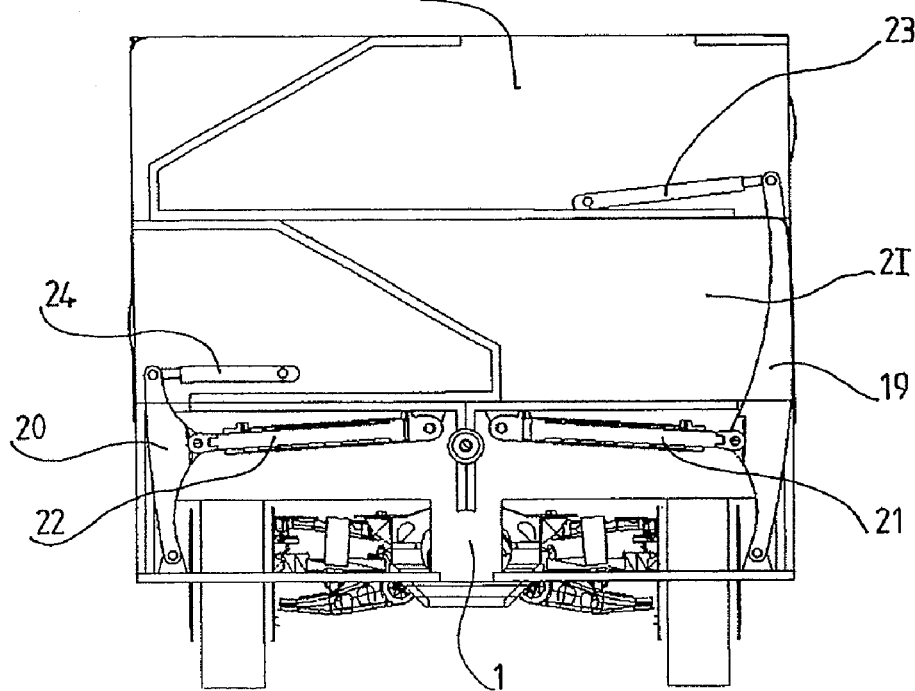
Fig. 20A
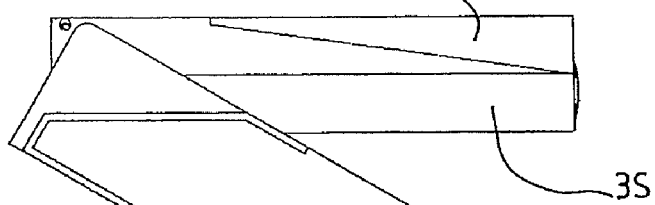
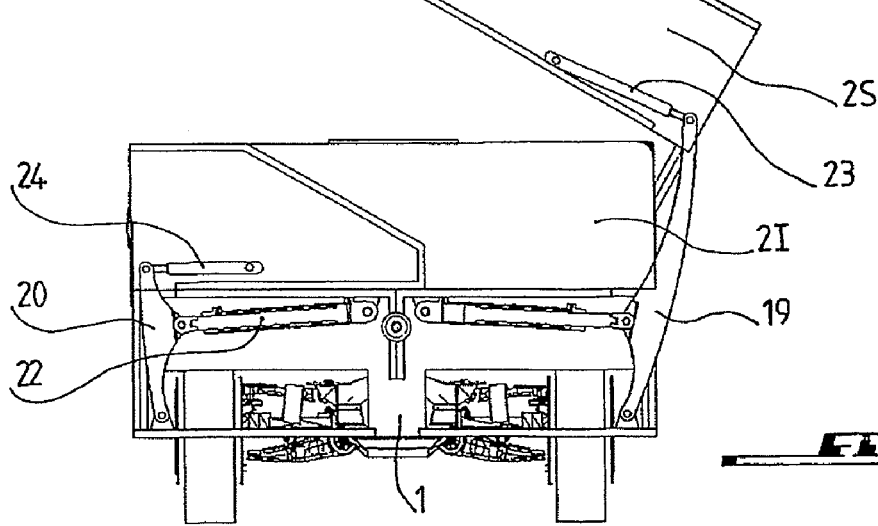
Fig. 20B

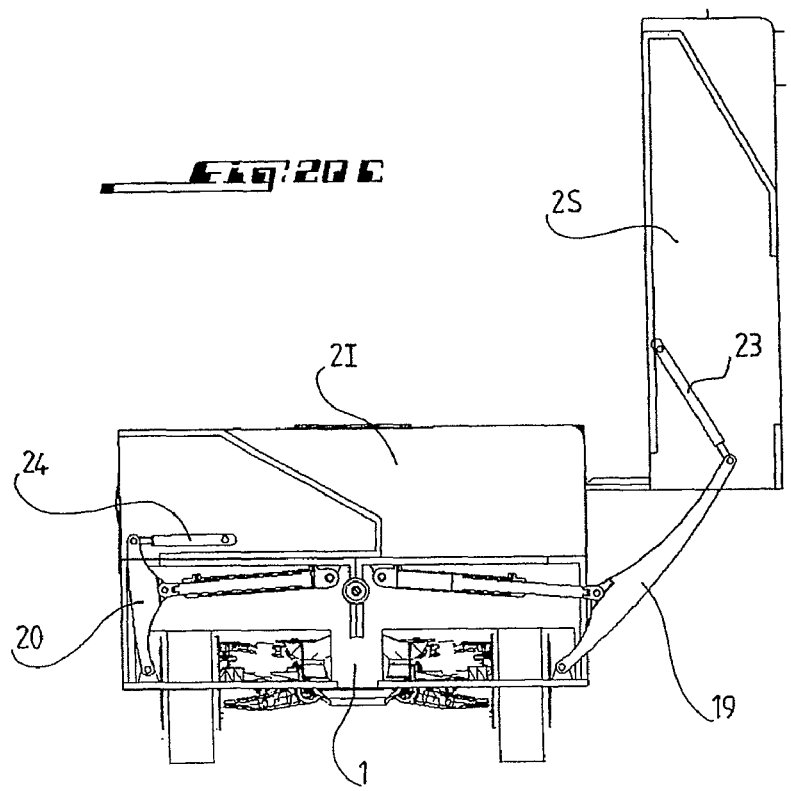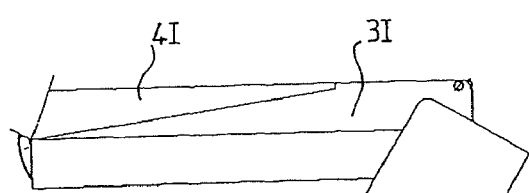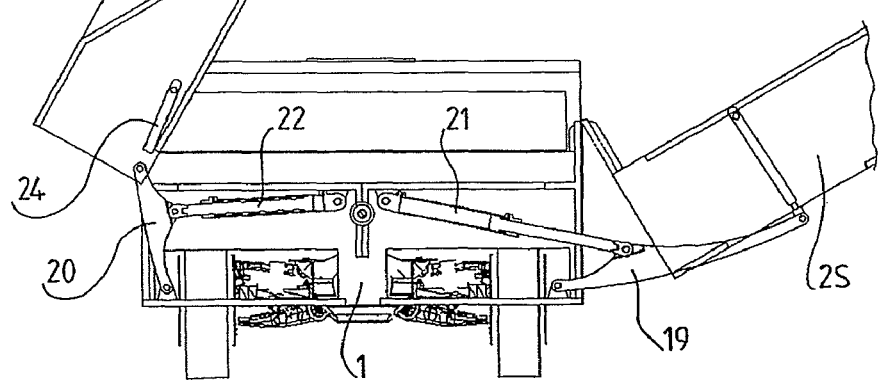

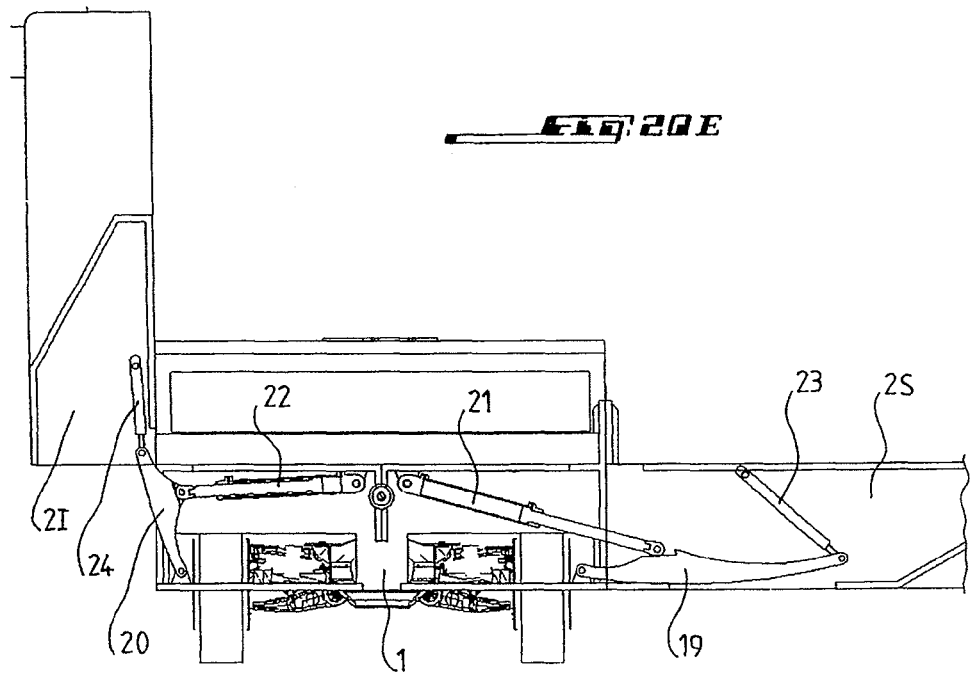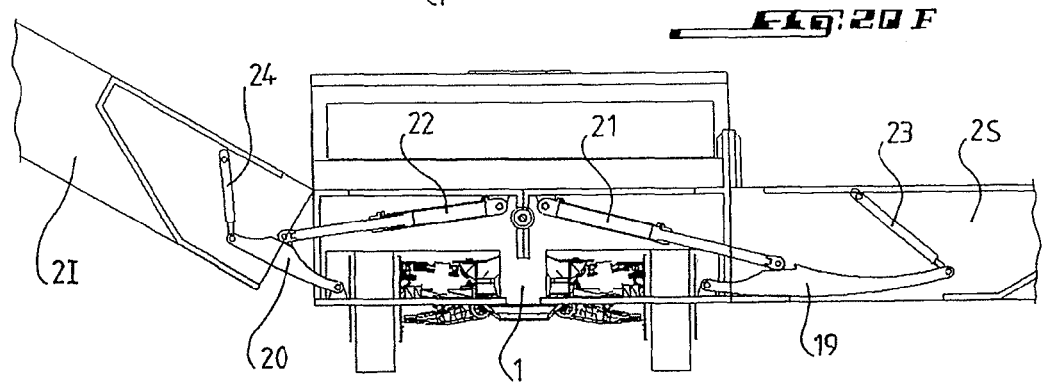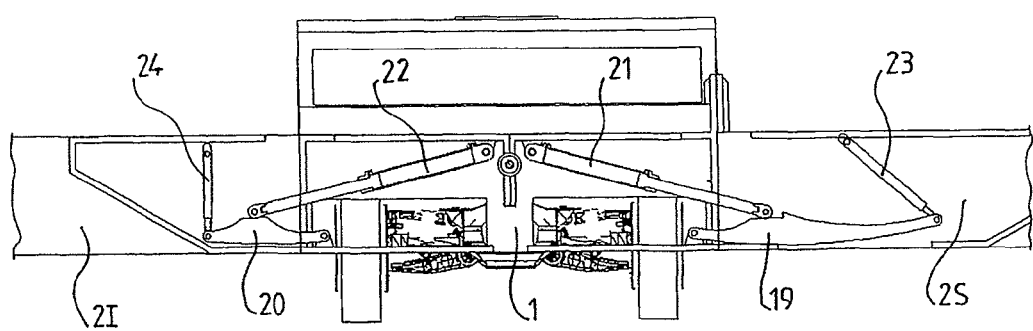

AMPHIBIOUS VEHICLE FOR BRIDGING A WATER-FILLED OPENING

FIELD OF THE INVENTION

The present invention relates to an amphibious vehicle for forming a pontoon or a ferry in order to breach a water-filled opening. As the breaching of water-filled or dry openings is mainly but not exclusively one of the main fields of activities of military engineering, the present invention will be mainly interested in the construction of military amphibious vehicles which have to be conformed in order to enable the crossing both of vehicles, notably heavy military vehicles for example up to 110 tons, but also personnel with their equipment. Further, it is desirable that the equipped vehicle of the invention be air-transportable so that it may be moved rapidly from one region to another and this at least by plane, also preferably by helicopter.

BACKGROUND

In order to meet these different expectations, the amphibious vehicle should be conformed so as to be used satisfactorily and as far as possible equivalently both on water and on firm ground. Further, it should be able to cross without any external help the intermediate region between the water and the ground and should notably be able to be adapted to the morphology of banks or shores. Finally, but without being exhaustive in the required characteristics of an amphibious vehicle which are met by the vehicle of the invention, the amphibious vehicle should be able to be used just as well alone as in a combination with one or more other vehicles of the same design, in order to form a pontoon.

In order to be able to meet both requirements of a road displacement and of being placed as a pontoon, the elements required for forming a bridge, such as caissons, floats, and ramps, have already been positioned in different ways on a vehicle forming a self-propelled rolling base. Among the different tested configurations, it is also found that of a rotating arrangement according to which the whole of the caissons, ramps and optionally floats form a pivotally mounted block on the rolling base. According to this design, when the vehicle is launched into the water, the longitudinal axis of the rolling base is approximately oriented parallel to the shore of the river or lake to be crossed. And when the vehicle is in position, the whole of the elements forming the bridge is rotated in one direction or in the other one by about 90° around a vertical axis.

However, the diversity of the morphologies of water-filled or dry openings to be crossed requires the possibility of adapting the arrangement of the elements forming a pontoon. In this sense, it proved to be disadvantageous to have to rotate the whole of the elements and/or having to deploy the whole of the elements.

Retractable or folding means for breaching dry or water-filled openings have been already used for a long time, mainly but not exclusively by military engineering. Such means have also already been used for some time on road vehicles or amphibious vehicles in order to give a certain autonomy to these breaching means, which is particularly important in a military application.

Thus, for example document FR-2 049 125 describes a bridge-shaped amphibious vehicle provided with floats placed above the chassis of the vehicle for moving over firm ground, these floats may be pushed back towards the outside on both sides for moving on water. In the folded-back configuration, the floats, which have a rectangular section, are placed with their narrow sides, side by side above the chassis of the vehicle, and are guided by connecting rods so that the wide sides turned towards each other, form a continuous covering surface after deployment of the floats. This vehicle has the disadvantage of a rather significant height in the folded-back configuration. Independently of the fact that such an outline involves a risk of instability when the vehicle is moving over irregular ground, it is easily understood that such a vehicle is more easily located than a flat vehicle.

A flatter vehicle is described in document FR-A-2 383 035. This is an amphibious vehicle intended to act as a pontoon or barge and including at least two floats which are put away over each other on the body of the vehicle while the latter moves over firm ground. This vehicle does not include any access ramps.

EP-A-1 332 896 describes an amphibious bridge and crossing vehicle comprising, in addition to a self-propelled main float and two tilting side floats, two sideways tilting foldable ramps, hydraulically moving up and down and each formed by a base of ramps and an end of ramps. In this amphibious vehicle, the kinematics of deployment of both side floats and of both ramps is rather complex, with the result that when the ramp base is unfolded and the ramp end is folded, the end of the ramp is found on the upper face of the ramp base and on the corresponding side float. Owing to this configuration of the amphibious vehicle, the floats and the ramps have to be entirely deployed in order to be able to use the vehicle.

SUMMARY OF THE INVENTION

The object of the invention is to propose an amphibious vehicle conformed in order to have different deployment configurations.

The object of the invention is achieved with an amphibious vehicle including elements such as caissons, floats and ramps, stored on each other on a self-propelled rolling base when the vehicle is in a folded configuration for moving on firm ground and conformed so as to be able to be deployed transversely relatively to a longitudinal axis of the rolling base when the vehicle should form, alone or with another vehicle of the same design, a pontoon or a ferry to breach a water-filled opening.

According to the invention, the vehicle comprises a deployment device conformed in order to begin to deploy the elements of one side before beginning to deploy the elements on the other side of the rolling base in at least three different configurations, the elements on each side including from the inside outwards in the deployed configuration, a caisson, a float and a ramp respectively which are hinged together in a Z configuration.

The vehicle of the invention therefore includes two assemblies of deployable elements, laid out symmetrically and positioned over each other on the body of the vehicle so that the first assembly is deployed towards one side of the rolling base and the second set is deployed towards the other side of the rolling base.

Further, because of the storage of one of the two assemblies over each other, in the folded configuration of the vehicle, but for nevertheless obtaining deployment as fast as possible, the deployment device is formed in order to begin to deploy the elements of the upper assembly before beginning to deploy the elements of the other side of the rolling base on the one hand and in order to begin to deploy the second elements when deployment of the first elements is still in progress, on the other hand.

Moreover, the vehicle of the invention is conformed in order to obtain deployment of the elements in different configurations depending on whether the vehicle is used alone or in combination with at least another vehicle of the same design and according to the length of the pontoon or the ferry to be established.

For this purpose, the invention also relates to the features hereafter, considered individually or according to any technically possible combination:

the vehicle is conformed so that, according to a first deployment configuration, the elements of each side are deployed minimally, each of the floats and ramps being located below the deployed corresponding caisson;

the vehicle is conformed so that, according to a second deployment configuration, the elements of one side are deployed minimally and the elements of the other side are entirely deployed;

the vehicle is conformed so that, according to a third deployment configuration, the elements of each sides are entirely deployed;

the vehicle is conformed so that, when at least two vehicles are connected in order to form a pontoon or a ferry, the ramps are maintained folded back on the sides used for the interconnection between both adjacent vehicles;

the vehicle comprises on the caissons and on the floats, locking elements with which at least two vehicles may be locked together in order to form a bridge or a ferry;

the locking elements are positioned on each caisson and float interface, symmetrically, in order to be able to produce any type of connection between two vehicles;

the locking elements include on each caisson and float interface, male locks and female locks;

each float-ramp assembly includes disengageable hinges providing the possibility depending on the performed engagement/disengagement, that a same actuator drives the deployment or the tilting of the corresponding float-ramp assembly, respectively.

The vehicle of the invention is designed so that it may move autonomously both on firm ground, as an oversize load, and on water. It may also be transported by a cargo aircraft. On the road, the vehicle has a range of the order of 800 km. The chassis of the vehicle is made as a sealed body, including propulsion and transmission elements towards the axles. The axles, generally three in number, are driving and steering axles, and thus allow the vehicle to move wherever a turning radius of 25 m is sufficient. The loads on the axles do not exceed 13 tons and the maximum speed on firm ground may attain about 65 km an hour. In an off-road mode, the vehicle of the invention has breaching capacities corresponding to those of most military land vehicles which it will have to follow during operation when it is a military vehicle. As an indication, the main dimensions of the vehicle of the invention are an overall length of about 12 meters, an overall width less than 3.60 meters and an overall height less than 3.80 meters.

As regards the layout and the deployment of the deployable elements of the vehicle of the invention, the latter are arranged so that a vehicle which has to embark onto the pontoon, embarks perpendicularly to the longitudinal axis of the body-cabin assembly. Moreover, a joint for accessing the banks is made at the junction between caisson and float, the fixed loading length being equal to three times the width of the body.

Moreover, in the entirely deployed condition, the vehicle of the invention has aquatic performances which observe the criteria defined by the standards in effect, for example as regards the minimum freeboard, the navigation speed, the trim and the heel.

The vehicle of the invention is moreover designed so that it may be connected to a vehicle of the same design and may thereby form a ferry with a capacity for bearing a heavy full track vehicle. Further, this combination of two vehicles has the same navigation capacities and performances (maximum speed under load, draught, etc.) as a ferry formed by a single vehicle. In the case of connection of two vehicles, the latter may be entirely deployed except for the ramps on the side where the connection should be established. In a long connection, both vehicles are connected through the float/ramp interface while in a short connection, they are connected through the caisson/float interface. Both connected vehicles are propelled by twice two aquatic engines positioned so as to be able to navigate at maximum speeds in any direction.

In order to transport a heavy wheeled vehicle, three vehicles of the invention may be connected together to form a ferry.

In order to form a bridge, several vehicles may be connected to each other. In such a combination, when the gap is so wide that a single vehicle is sufficient, two vehicles are used as an end module, i.e. on the side of the banks, all the elements are deployed, including the ramps, and on the side of the connection with the other—or with another—vehicle, only the caissons and also possibly the floats are deployed, in any case not the ramps. If necessary, one or more vehicles are used as a central module or as intermediate modules in the long, short or half-short deployment configuration, the ramps of the central module or of the intermediate modules remaining folded back in all the cases. The different possible deployment configurations of the vehicles of the invention provide the bridge with a capacity of covering any gap width from 29 meters onwards, the minimum step being less than the covering amplitude of the ramps on the bank.

BRIEF DESCRIPTION OF DRAWING FIGURES

Figure 3:
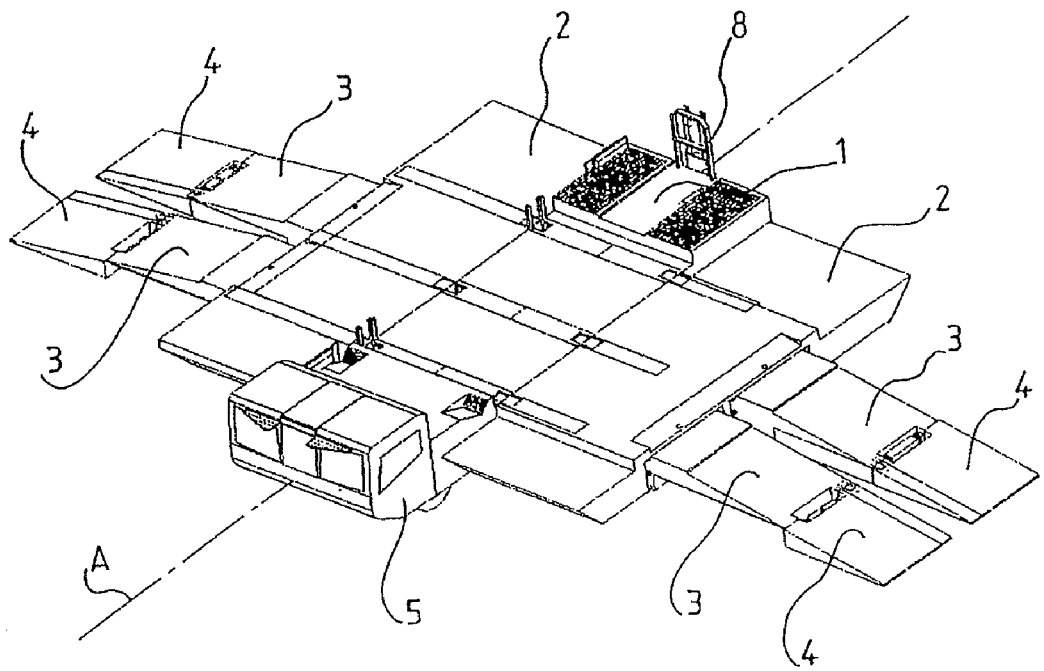
Figure 4:
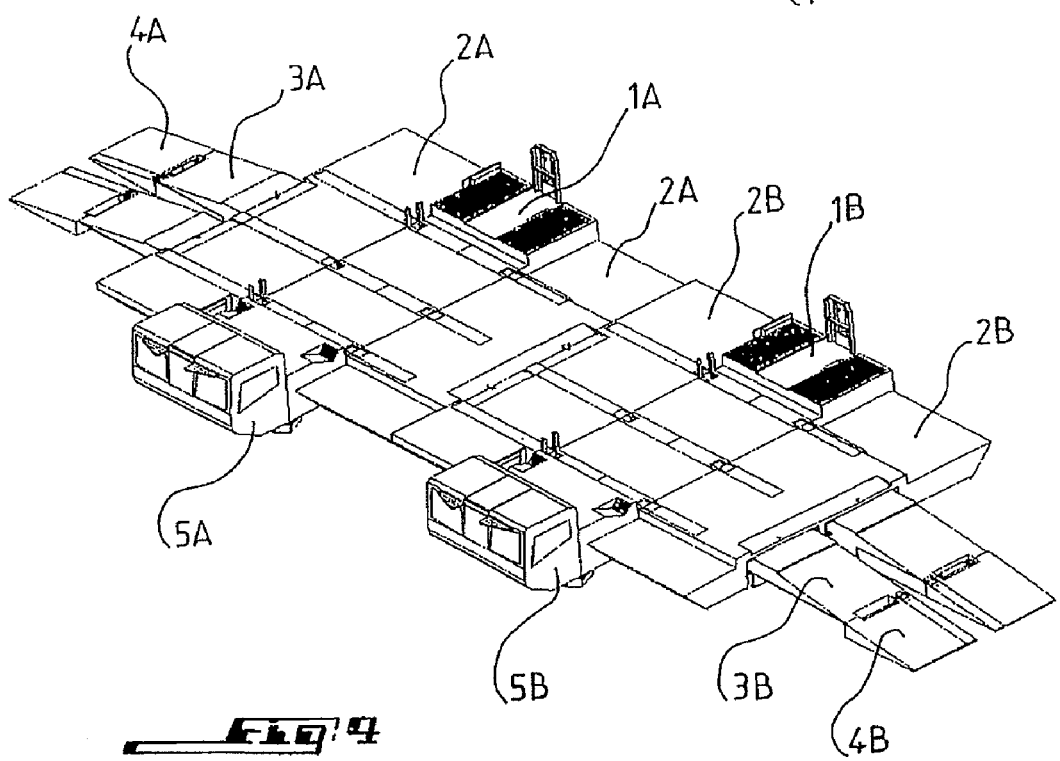
Figure 17:
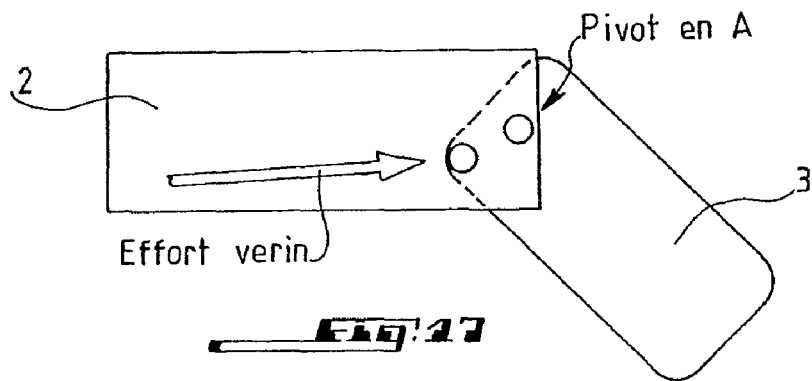
Figure 18:
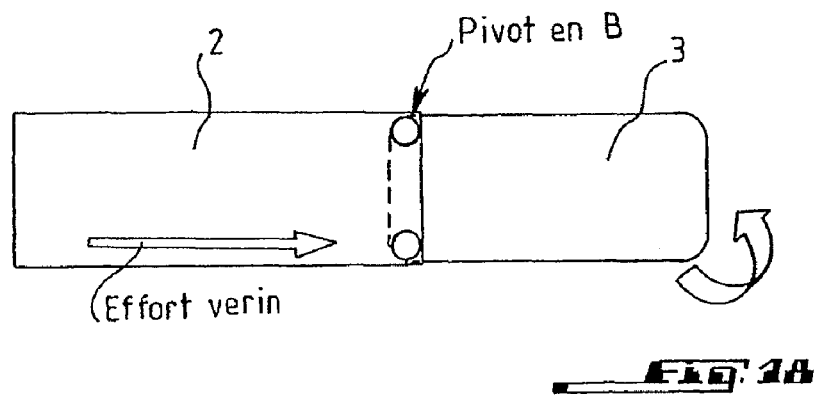
Figure 19:
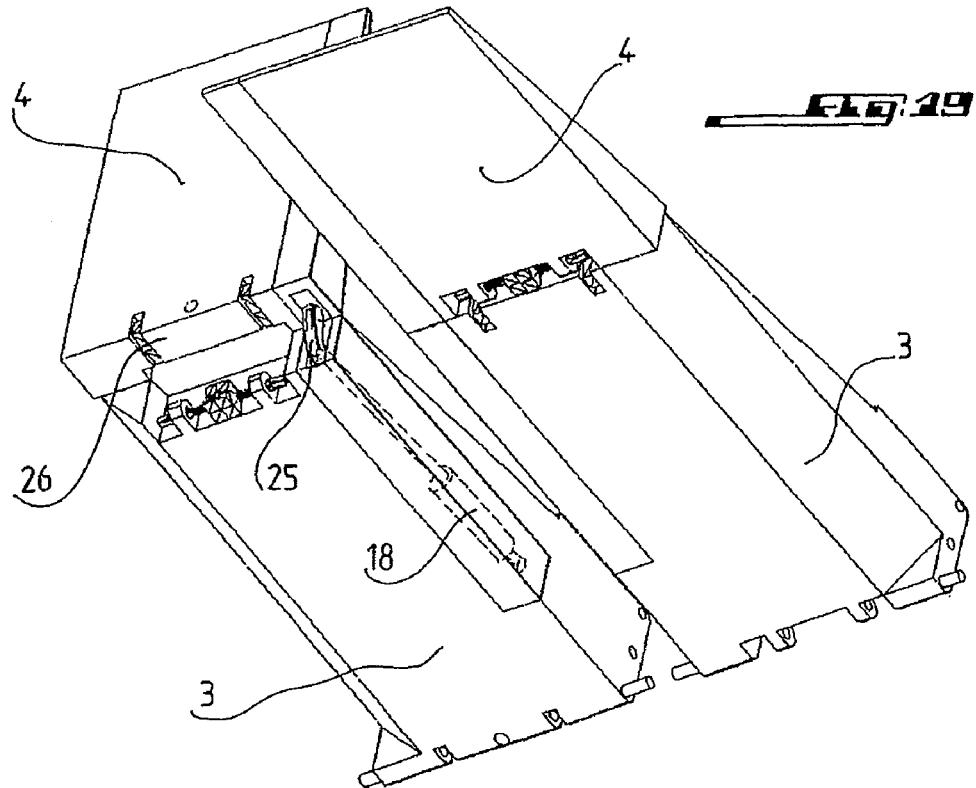
Figure 23A:
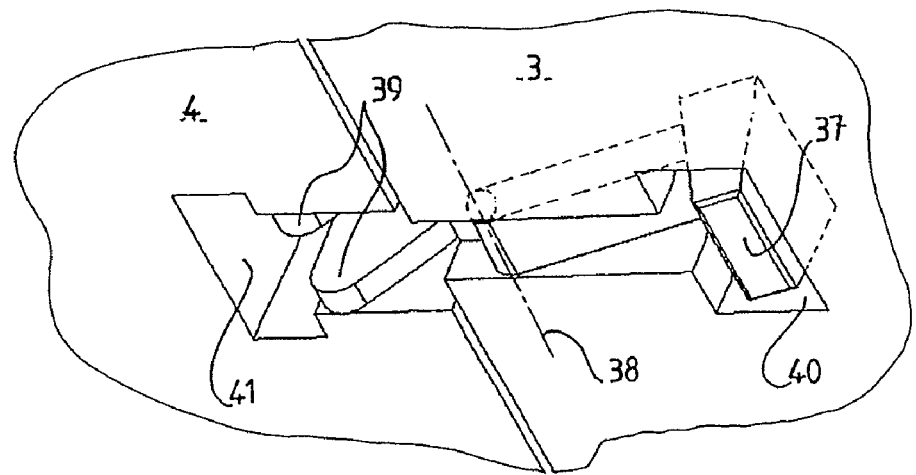
Figure 23B:
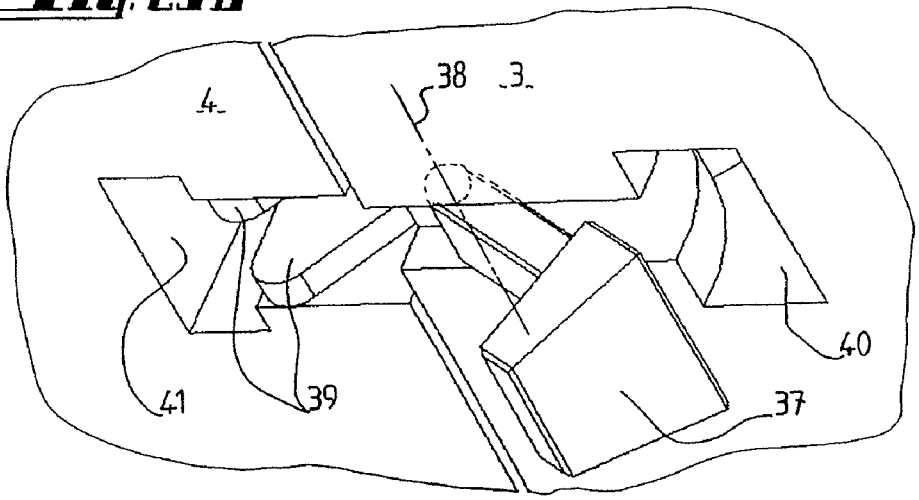
Figure 23C:
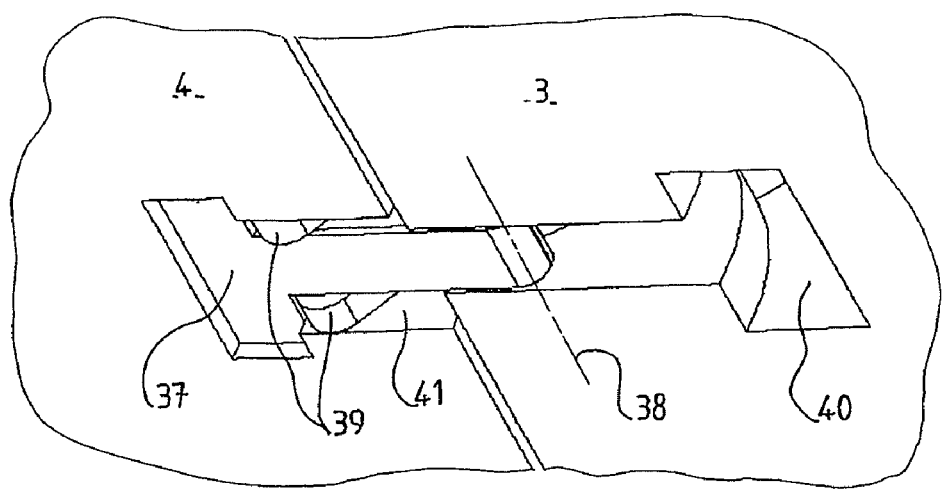
Figure 24A:
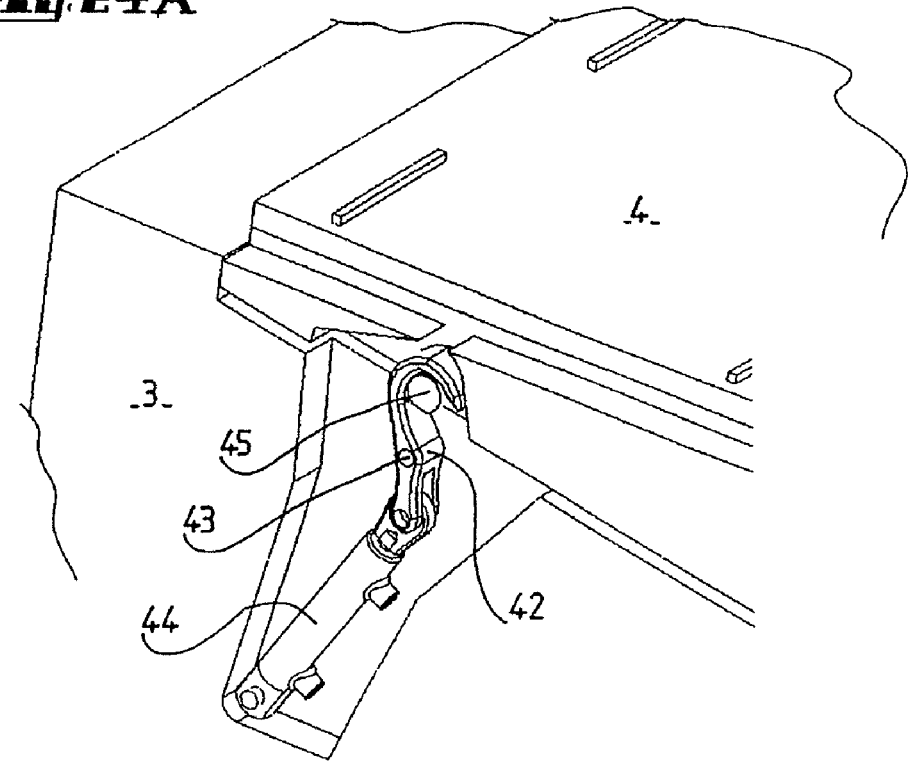
Figure 24B:
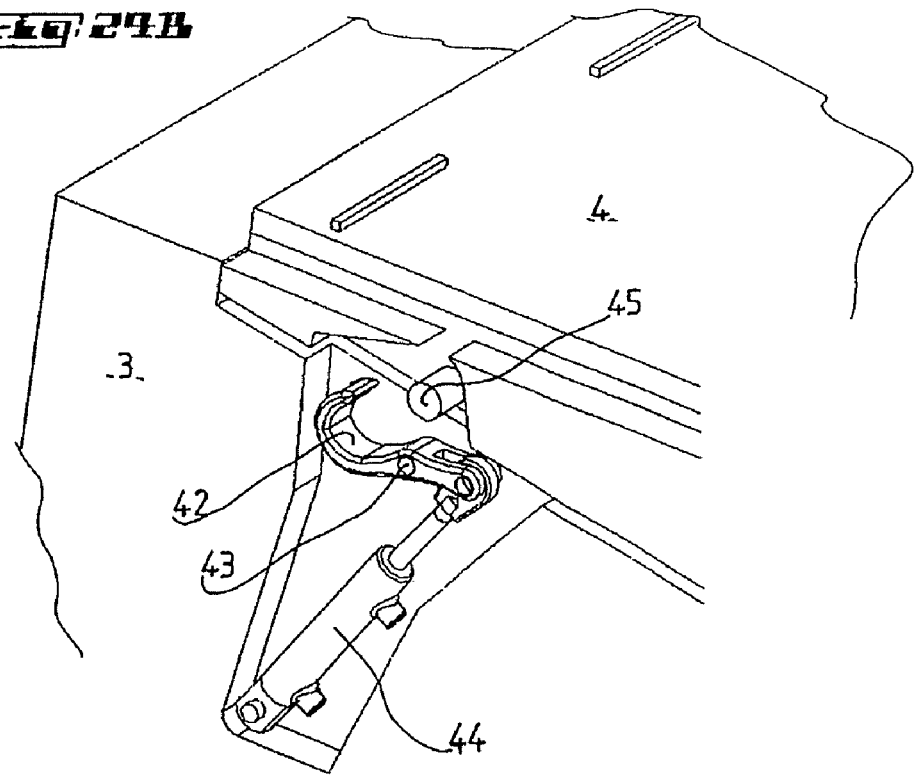
Figure 25:
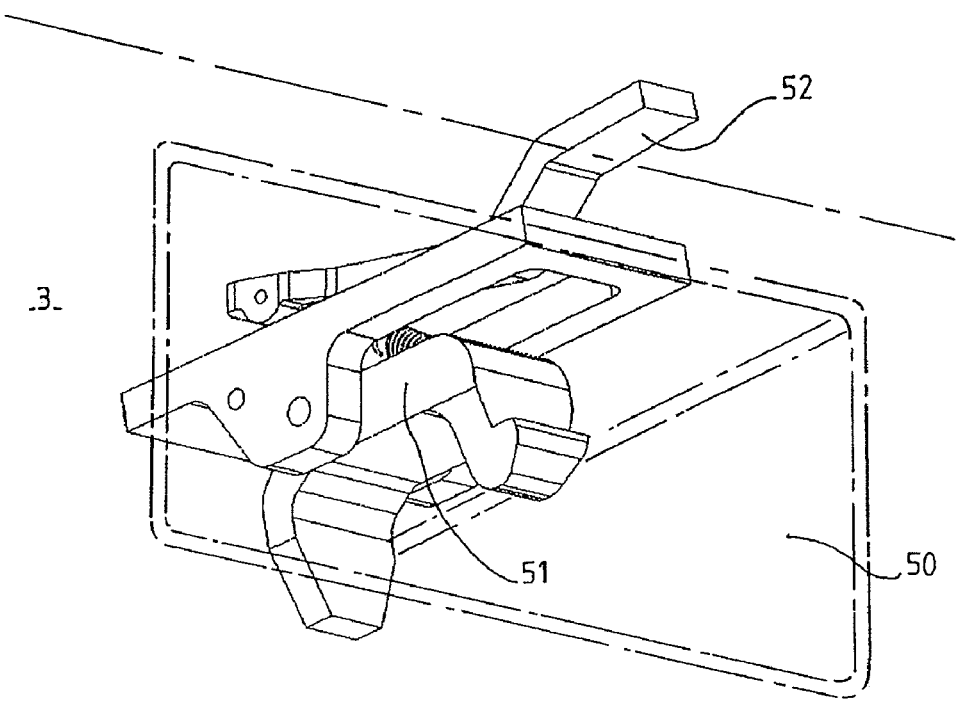
Figure 26:
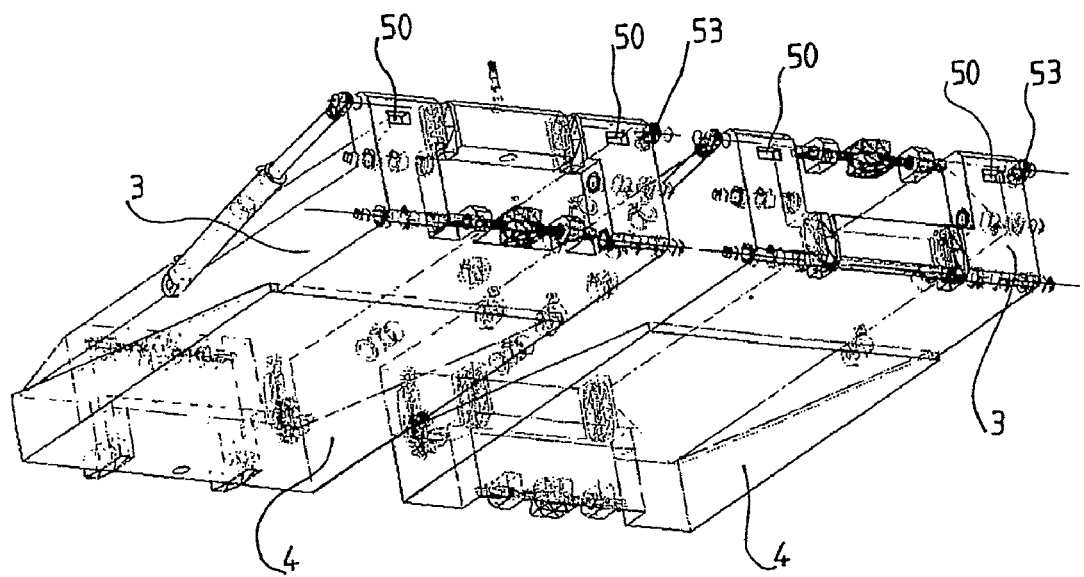
Figure 27:
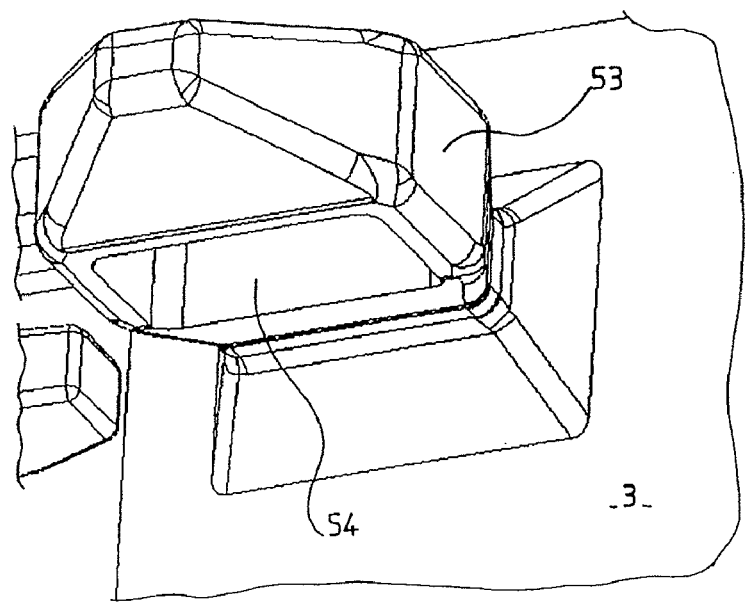
Figure 28:
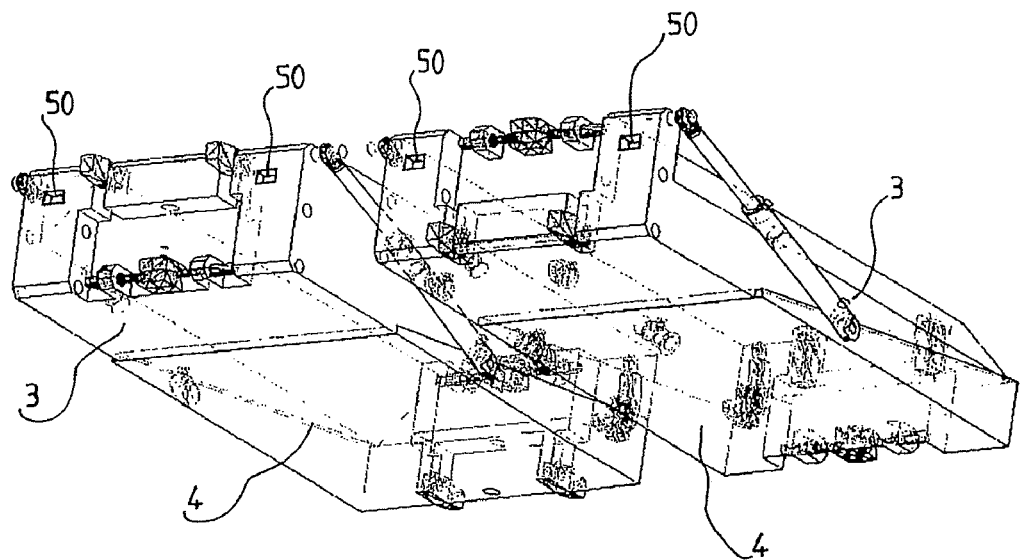

Other features and advantages of the present invention will become apparent from the description hereafter of an embodiment of the vehicle of the invention. The description is made with reference to the drawings wherein FIGS. 1 and 2 illustrate a vehicle of the invention in the road transport mode in a front upward and front downward perspective, respectively, FIG. 3 illustrates the vehicle of FIG. 1 in the entirely deployed ferry mode, FIG. 4 illustrates an assembly of two vehicles of the invention in the ferry mode connected together, FIG. 5 illustrates the assembly of both vehicles of FIG. 4 in a perspective view from below, FIGS. 6A-6D illustrate the kinematics of a short deployment of a vehicle of the invention, FIGS. 7A-7E illustrate the kinematics of deployment of a vehicle of the invention entirely deployed on one side and deployed as a short version on the other side, FIGS. 8A-8E illustrate the deployment kinematics of a vehicle of the invention right up to full deployment of both sides of the vehicle, FIG. 9 illustrates a vehicle of the invention in a perspective view from below showing the propelling means, FIG. 10 illustrates the body of a vehicle of the invention and propulsion and transmission means, FIG. 11 illustrates the means for deploying the float the ramps attached to a caisson of a vehicle of the invention, FIG. 12 illustrates individually both caissons and the associated floats and ramps of a vehicle of the invention, the elements being entirely deployed, FIG. 13 illustrates the body of a vehicle of the invention with the location of the supply lines and of means for cooling the heat engine and the location of the deployment means, FIG. 14 illustrates in more details than in FIG. 13, the deployment means and their arrangements on the body of a vehicle of the invention, FIG. 15 illustrates the superposition of both bodies and associated floats and ramps of a vehicle of the invention, in the folded-back condition, FIG. 16 shows the layout and the position of the different means for deploying the floats and the ramps on a caisson of the vehicle of the invention, FIG. 17 schematically illustrates the deployment of a float and the origin of the forces of an actuator, FIG. 18 schematically illustrates a caisson and a deployed float and the origin of the forces of an actuator in order to obtain tilting of the caisson/float assembly, FIG. 19 schematically illustrates in a perspective view from below two adjacent floats with their corresponding ramps and the means for deploying the ramps, FIGS. 20A-20G represent the deployment kinematics of both caissons of a vehicle of the invention, FIGS. 21A-21D represent different views of the positioning of the actuators intended for deploying the floats, FIGS. 22A-22D illustrate the deployment of the ramps and the layout of the means by which deployment of the ramps may be obtained, FIGS. 23A-23C illustrate the kinematics of a means for locking a float deployed on the caisson, FIGS. 24A and 24B illustrate the kinematics for opening a locking means ensuring that the ramps are maintained on the corresponding float, FIG. 25 illustrates in detail the female means of a locking device between two adjacent vehicles, FIG. 26 illustrates the positioning of the female locking means of FIG. 25 on floats of a vehicle of the invention, FIG. 27 illustrates in detail the male element of a locking device between two adjacent vehicles, and FIG. 28 illustrates the positioning of a male means of FIG. 27 on floats of a vehicle of the invention.

DETAILED DESCRIPTION

Figure 2:
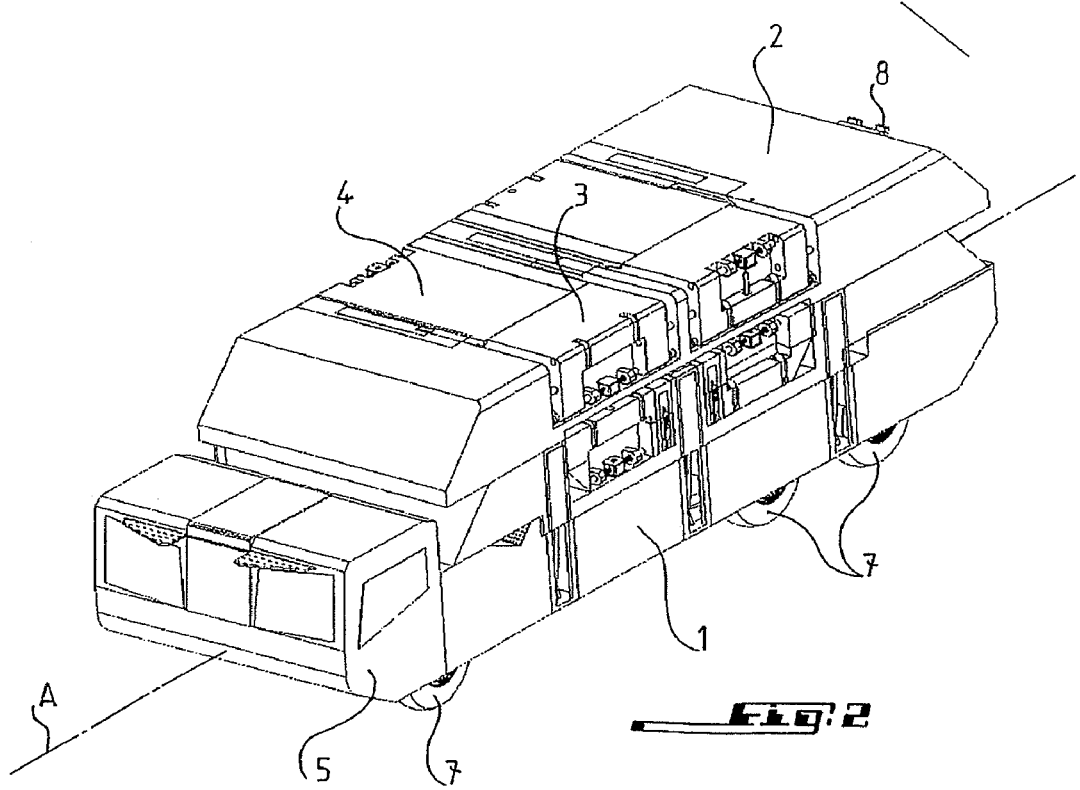

An amphibious vehicle according to the present invention as illustrated for example in FIGS. 1 and 2, comprises a rolling base as a sealed self-propelled body 1 in aluminium, with an armored cabin 5 for at least two persons, although the vehicle of the invention may be operated and handled by a single person, the cabin 5 being integral with the structure of the body 1, and a drive chain with at least three axles 7, each of which is provided with independent wheels. Each of the axles has an all-wheel drive transmission for each of the two wheels and each of the wheels of said at least three axles is a steered wheel.

The cabin 5 is designed so that exiting of the occupants into the water may be accomplished through the upper portion of the side opening frames. This exiting is optional, because in the cabin, the space and the visibility are sufficient for implementing the ferry(ies) or the pontoon.

The vehicle of the invention moreover comprises an assembly of two caissons 2, four floats 3 and four ramps 4 with which the roller track may be made up in the extension of the central portion of the body 1.

The deployment and the withdrawal of the caissons 2, the floats 3 and the ramps 4 are obtained by means of a device including connecting rods, actuators and control bars positioned at each junction of elements. These arrangements for applying deployment and withdrawal of the elements of the vehicle of the invention are described further on, for example with reference to FIGS. 20A-20G.

On the vehicle of the invention, and more particularly on the body 1, the elements which may be deployed, i.e. both caissons 2, the four floats 3 and the four ramps 4, are conformed and positioned so as to be able to be deployed transversely to a longitudinal axis of the rolling base or body 1 on the one hand, and, so as to be able to be deployed towards each other on both sides of the vehicle of the invention on the other hand, respectively. For this purpose, each of the two caissons 2 is hinged on the body 1 so as to be able to be deployed on the right side or on the left side of the vehicle respectively, and moreover so that, when being entirely deployed from the elements, each of the caissons is extended with two floats 3 which on their side are extended with two ramps 4. Each of the two assemblies formed by one caisson 2, two floats 3 and two ramps 4 is hinged in a Z configuration. Further, both caisson/floats/ramps assemblies are positioned above each other, which implies a predetermined order for deployment and withdrawal, both caissons therefore not being able to be deployed simultaneously, but with a shift of the beginning of the deployment or of the beginning of a withdrawal of one of the caisson/floats/ramps assemblies before the other, respectively.

Both caisson/floats/ramps assemblies are to within a few details, identical with each other and are positioned above each other and oriented in the opposite direction relatively to each other. The differences between the two assemblies mainly relate to the joints of both caissons on the body 1, since one of the two caissons is positioned above the other and is therefore further away from the body 1. This implies, for example, longer connecting rods for the upper caisson relatively to the connecting rods of the lower caisson and a passage in the lower caisson in order to let through the connecting rods of the upper caisson.

The vehicle of the invention is moreover equipped with an aquatic propulsion system referenced as 6 in FIG. 1, as well as an exhaust 8 illustrated in FIG. 2.

With the design of the invention, according to which both caisson/floats/ramps assemblies are positioned above each other when the vehicle is in the folded back condition, and not beside each other, it is possible to give to each of both caissons and to each of both floats, a track length, measured transversely relatively to the longitudinal axis A of the body 1, which corresponds to the entire width of the body 1. Further, with the design of the invention, it is possible to even give to each of the ramps a track length corresponding to the entire width of the body 1. The fact that in the embodiment of the vehicle of the invention illustrated in the appended drawings, the ramps 4 have a track length less than the track length of the floats 3 is arbitrary and does not limit by any means the design principle stated hereinbefore.

FIG. 3 illustrates the vehicle of the invention in the deployed mode and forming by itself a ferry or pontoon. It will be noted for this FIG. 3 and the other figures that, taking into account the nearly entire identity of the caissons 2 with each other, of the floats 3 with each other and of the ramps 4 with each other, and in order not to burden the description of the invention, the caissons, floats and ramps are respectively referenced as 2, 3 and 4 without distinguishing the side of the vehicle, either right or left, towards which they are deployed, or distinguishing their position either upper or lower position, when they are folded back. Exceptions to this rule concern cases when a distinction is inevitable because of the treated details.

In the mode of deployment of FIG. 3, the vehicle is entirely deployed, i.e. the floats and the ramps are all deployed. A vehicle intended to cross the pontoon or to be transported on the ferry, embarks perpendicularly to the body/cabin assembly, i.e. transversely relatively to the longitudinal axis A of the body 1. As the joint for accessing the banks is produced at the junction between the caisson 2 and the floats 3, the fixed loading length is equal to three times the width of the body.

FIG. 4 illustrates a deployment mode which differs from that of FIG. 3 by the fact that the ferry or the pontoon is formed by more than one vehicle, here in this case, by two vehicles. For this purpose, two vehicles according to the invention are positioned parallel to each other and spaced apart from each other as required, so that they may be connected to each other through their corresponding caissons 2.

Indeed, according to the deployment mode illustrated in FIG. 4, a first vehicle of the invention including a body 1A and a driver cabin 5A appears beside a second vehicle having a body 1B and a driver cabin 5B. On the first vehicle, only the caisson 2A oriented towards the second vehicle is deployed. Analogously, on the second vehicle, only the caisson 2B oriented towards the first vehicle is deployed. Both vehicles are connected to each other through the two faces opposite both respective caissons 2A, 2B.

And on both respective opposite sides of the both vehicles of the invention, i.e. on both outer sides of this unit of vehicles of the invention, the ramps of which are intended to be supported on the banks of a water-filled opening to be surmounted, all the elements of both caisson/floats/ramps assemblies are deployed. In an analogous way to the deployment mode illustrated in FIG. 3, the fixed loading length of the unit formed by both vehicles of the invention is equal to six times the width of a vehicle.

As the deployment mode for a ferry or pontoon illustrated in FIG. 4 is not limited to two vehicles, the configuration according to this deployment mode may be described as follows: the ferry or pontoon is formed by a sequence, indicated in the order of the elements forming the track intended to receive vehicles, of two ramps 4A, two floats 3A, one caisson 2A, the body 1A of a first vehicle of the invention, the other caisson 2A of the first vehicle, a caisson 2B of a second vehicle, the body 1B of the second vehicle, the other caisson 2B of the second vehicle, as many sequences of caisson—body—caisson as there are vehicles beyond a total of three vehicles and finally on the last vehicle in this order, a caisson 2x, the body 1x, the other caisson 2x, two floats 3x and two ramps 4x.

It is specified here, for all intents and purposes, that in the illustration of FIGS. 3 and 4 and on other figures of the appended drawings, the bodies 1 are illustrated without the axles 7 or the engine elements, or further central decks containing the space between the floats and the ramps or finally heighteners which may be provided on the edge of the caissons 2 and therefore of the track on which passes a vehicle, the assembly of vehicles forming a pontoon or a ferry.

FIG. 5 illustrates a unit or pontoon formed by two vehicles of the invention, in a perspective view from below the unit. It is therefore of the same composition of vehicles of the invention as in FIG. 4. However, with FIG. 5 it is possible to locate the different means required for deployment and withdrawal of the elements of each of the vehicles of the invention.

Thus, for example, the arrangement of the connecting rods is seen by which the ramps 4A or 4B are jointed to the corresponding floats 3A or 3B as well as the arrangement of actuators at the junction between the caissons 2A or 2B and the corresponding floats 3A or 3B. For more details, see FIGS. 21A-21D and 22A-22D.

Although this is not specially illustrated in the drawings, it is also conceivable that both vehicles of the invention are deployed in a long connection configuration and hitched up in order to form a unit intended to be used as a pontoon or as a ferry. In this case, on the outer sides of each of the vehicles, the caissons 2, the floats 3 and the ramps 4 are entirely deployed in order to provide support on the banks of a water-filled opening. On the inner side, i.e. on the two sides intended to cooperate in the connection of both vehicles to each other, and therefore as an alternative to what is illustrated in FIGS. 4 and 5, on each of the vehicles both on the caissons 2 and the floats 3 are deployed. Only the ramps 4 remain folded back under the corresponding floats.

In order to allow both a combination of two vehicles deployed both in a short connection configuration and a long connection configuration, both the caissons and the floats are equipped with locking means respectively allowing the locking of one caisson of a first vehicle on a caisson of a second vehicle or the locking of the floats of a first vehicle on the floats of a second vehicle.

Moreover, as regards the propulsion of an assembly of two or several vehicles forming a ferry, the assembly of two or more vehicles is propelled by the whole of the aquatic engines in order to be able to navigate at maximal speeds in any direction.

Figure 7A:
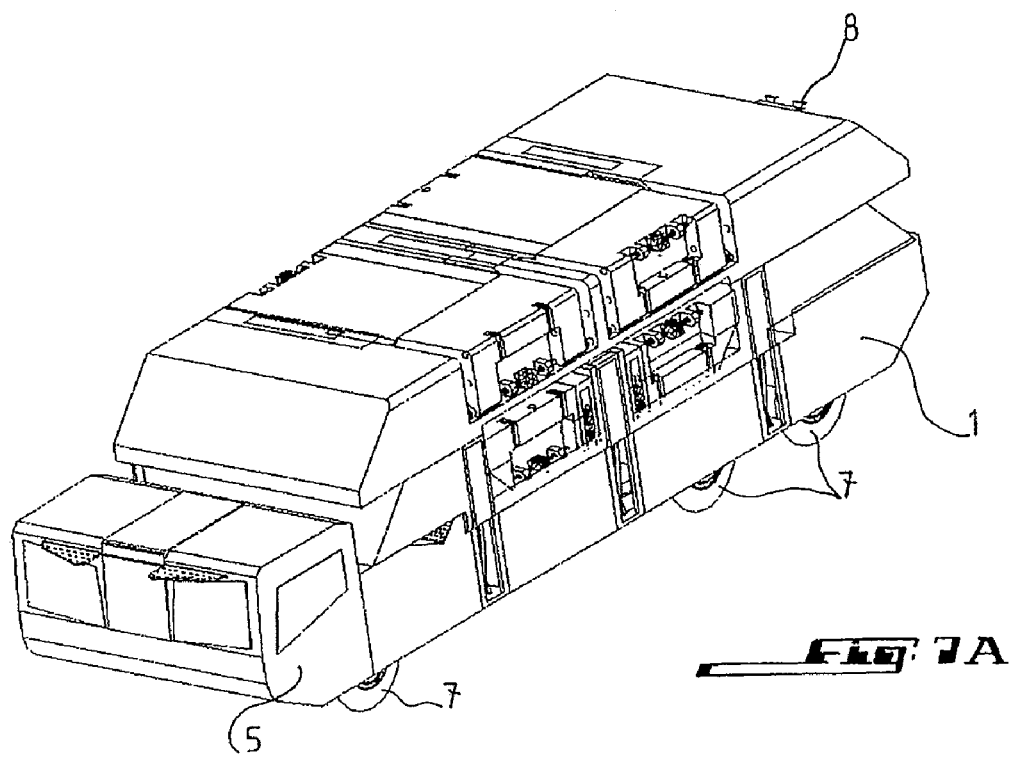
Figure 7B:
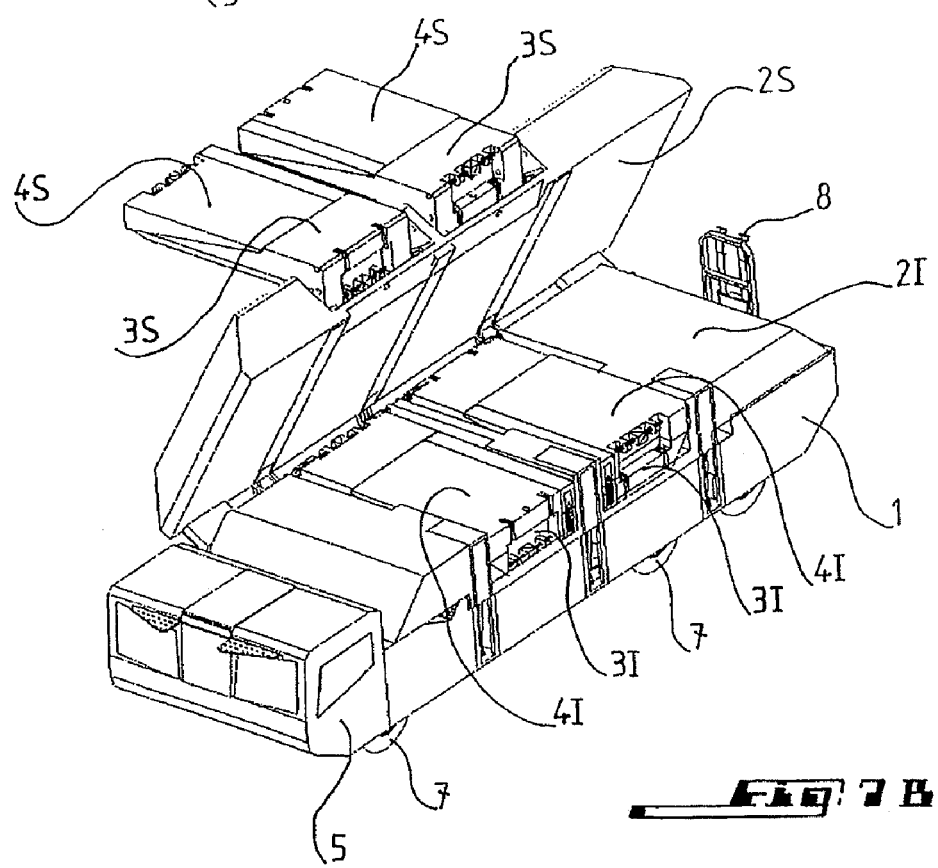
Figure 7C:
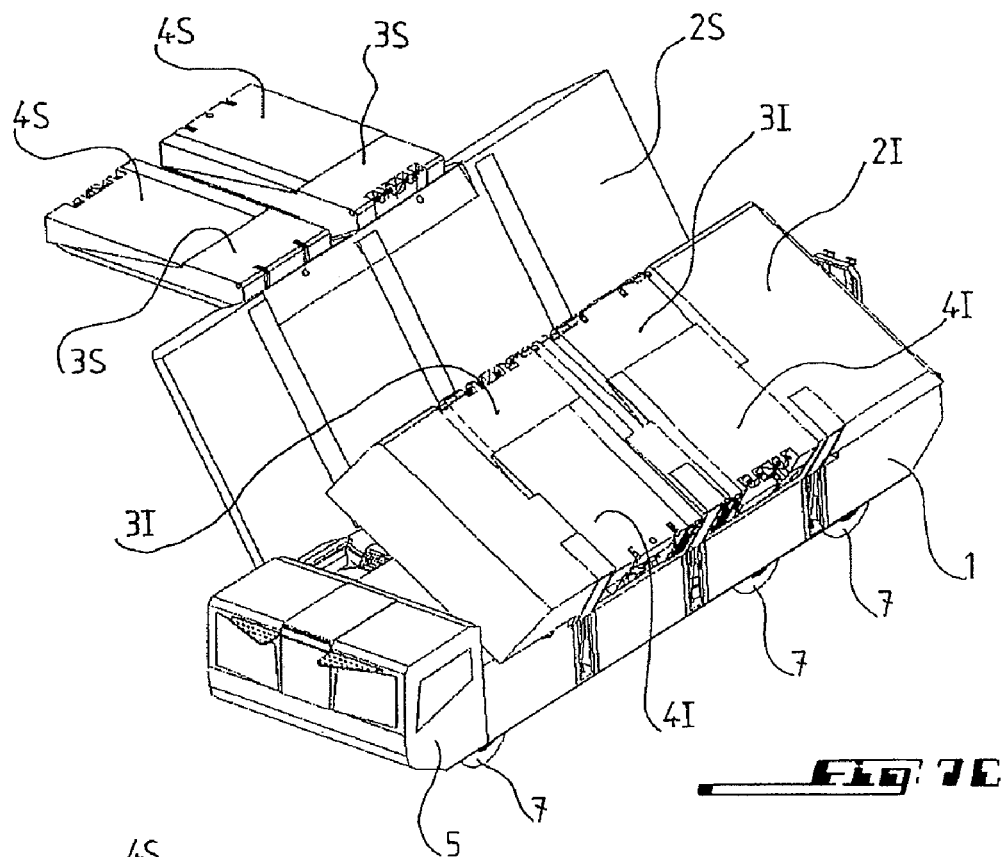

In order to fulfill the function of an amphibious vehicle for breaching a water-filled opening, the vehicle of the invention should be able to be deployed in at least three different configurations, and this by means of a central application device which for example allows the kinematics illustrated in FIGS. 6A-6D, 7A-7E and 8A-8E. In these three series of figures, FIGS. 6A, 7A and 8A illustrate a vehicle of the invention in its folded-back condition, i.e. in a configuration for moving on a road or another solid ground as opposed to an aquatic medium.

Thus, a vehicle of the invention includes in addition to its body 1, the driver cabin 5, the axles 7 and the exhaust 8, a lower caisson 2I and an upper caisson 2S respectively hinged on one side or on the other of the body 1. On the caisson 2I, are hinged two floats on which two ramps 4I are hinged on their sides. According to the embodiment illustrated in the series of FIGS. 6, 7 and 8, the lower caisson 2I is hinged on the left side of the body 1 of the vehicle while the upper caisson 2S is hinged on the right side of the vehicle. The notions of right and left refer to the direction of forward gear of the vehicle.

Because of the joint in a Z configuration between the caisson 2, the floats 3 and the ramps 4 of each caisson/floats/ramps assembly, the floats 3I are hinged on the caisson 2I on the right side of the vehicle, and the ramps 4I are hinged on the floats 3I on the left side of the vehicle. Analogously, the floats 3S are hinged on the caisson 2S on the left side of the vehicle and the ramps 4S are hinged on the floats 3S on the right side of the vehicle.

From this configuration of the elements of the vehicle of the invention illustrated in the appended drawings, the short deployment of the elements, illustrated in FIGS. 6A-6D, begins with deployment of the upper caisson 2S on which lie in a first phase in the folded-back condition, the floats 3S and the associated ramps 4S.

When the deployment of the caisson 2S is sufficiently advanced for clearing a space so that the lower caisson 2I may perform a pivoting movement, deployment of the latter begins. Analogously to the deployment of the upper caisson 2S, the deployment of the lower caisson 2I is accomplished in a first phase by holding the lower floats 3I and the lower ramps 4I in the folded-back condition against the lower caisson 2I.

FIG. 6C illustrates an intermediate deployment state of the vehicle of the invention where the upper caisson 2S is almost entirely deployed while the lower caisson 2I has still not passed the vertical position. At the same time, it may be observed in FIG. 6C that the floats and the ramps remain folded back on the caisson, since the vehicle has to be deployed in the short version.

FIG. 6D finally shows the vehicle of the invention in its short deployment condition, i.e. only the upper 2S and lower 2I caissons are deployed, and the corresponding floats and ramps are maintained folded back against the corresponding caissons. The floats 3S, 3I and ramps 4S, 4I are then found underneath the corresponding caisson 2S or 2I.

The series of FIGS. 7A-7E illustrates a half-short deployment mode of a vehicle of the invention. The deployment begins with the lifting of the upper caisson 2S. When the latter has reached a certain deployment level, the upper floats 3S are deployed, the upper ramps 4S remain beside the corresponding floats 3S.

When the upper caisson 2S has passed a certain deployment level clearing the space required for moving the lower caisson 2I, deployment of the lower caisson 2I begins with, analogously to the deployment of the upper caisson 2S, the floats 3I and the ramps 4I maintained in the folded-back condition against the caisson 2I. This intermediate situation is illustrated in FIG. 7C.

Figure 7D:
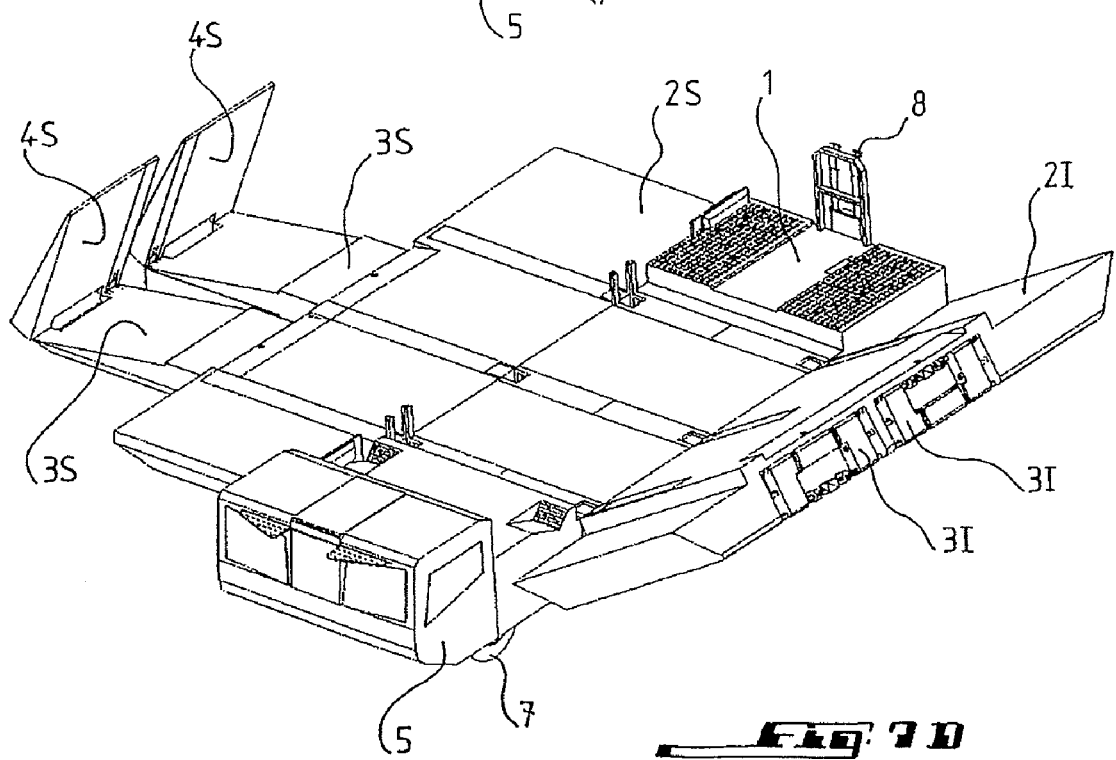
Figure 8C:
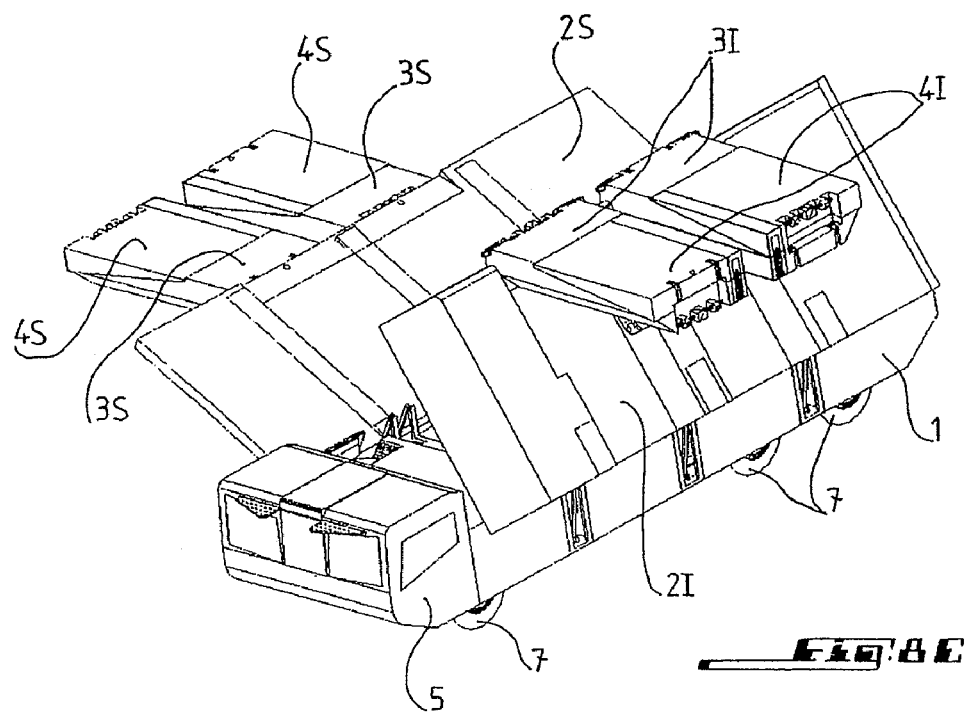

At a subsequent deployment instant illustrated in FIG. 7D, the upper caisson 2S is entirely deployed just like the upper floats 3S, while the upper ramps 4S are raised in order to form a limitation to the storage or traffic track of the bridge or ferry. At the same time, the lower caisson 2I is sufficiently advanced in its deployment, the corresponding floats 3I and the associated ramps 4I are held against the caisson 2I.

Figure 7E:
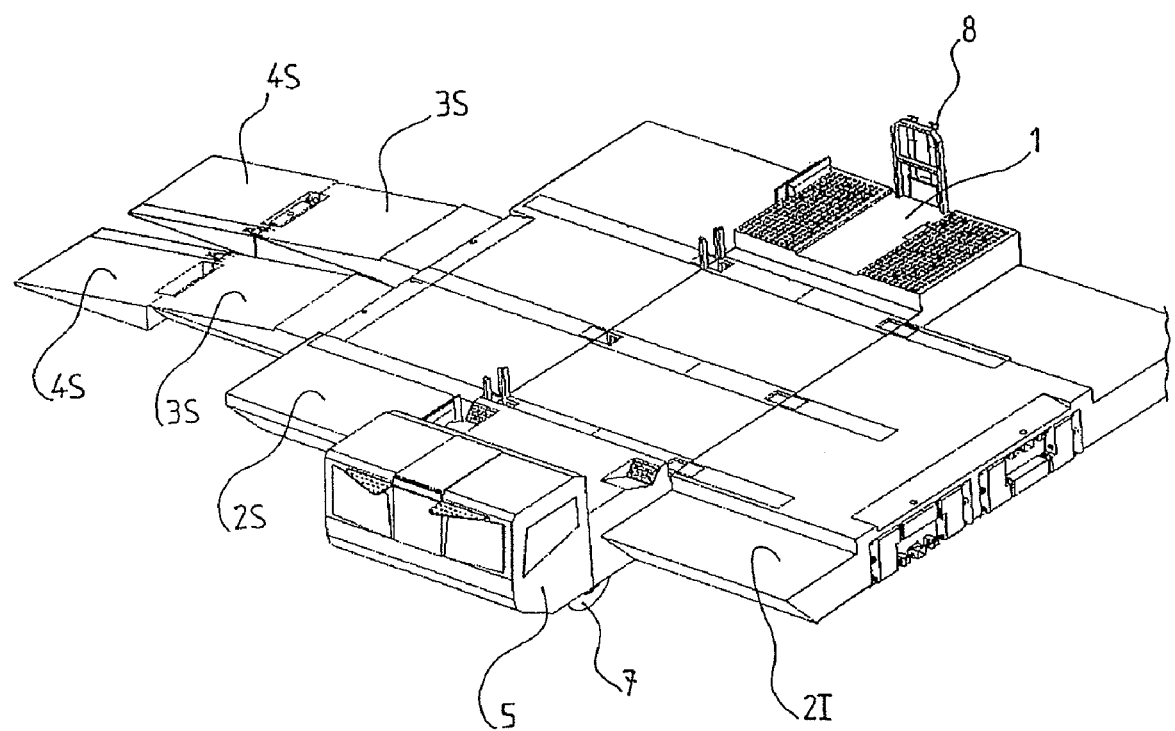

FIG. 7E illustrates the final half-short deployment condition of the vehicle of the invention. In this deployment condition, the upper 2S and lower 2I caissons are entirely deployed and on the right side of the vehicle the upper floats 3S and the upper ramps 4S are also entirely deployed. On the other hand, on the left side of the vehicle, the lower floats 3I and the associated ramps 4I remain held against the lower caisson 2I. There is therefore entire deployment on the right side of the vehicle while there is partial deployment, a so-called short connection deployment, on the left side of the vehicle.

As this is for example suggested by FIG. 4, the reverse arrangement is also possible. In this case, there is on the right of the vehicle only a deployment of the caisson 2S, while on the left side of the vehicle there is full deployment of the lower caisson 2I, lower floats 3I and corresponding lower ramps 4I.

Once again, it is observed that in these series of kinematic deployment illustrations, accessory means such as central decks and side heighteners are not illustrated.

During deployment according to a third deployment mode illustrated in FIGS. 8A-8E, the deployment of the elements begins with the deployment of the upper caisson 2S followed by deployment of both upper floats 3S when the upper caisson 2S has reached a certain deployment level. This situation is illustrated in FIG. 8B.

FIG. 8C shows the deployment at a latter instant when the upper caisson 2S is already widely deployed and the upper floats 3S are also deployed, while holding the associated ramps 4S against the upper floats 3S. At the same time, deployment of the lower caisson 2I has begun just like the deployment of the lower floats 3I. In this step, the associated ramps 4I are again placed against the corresponding floats 3I.

Figure 8D:
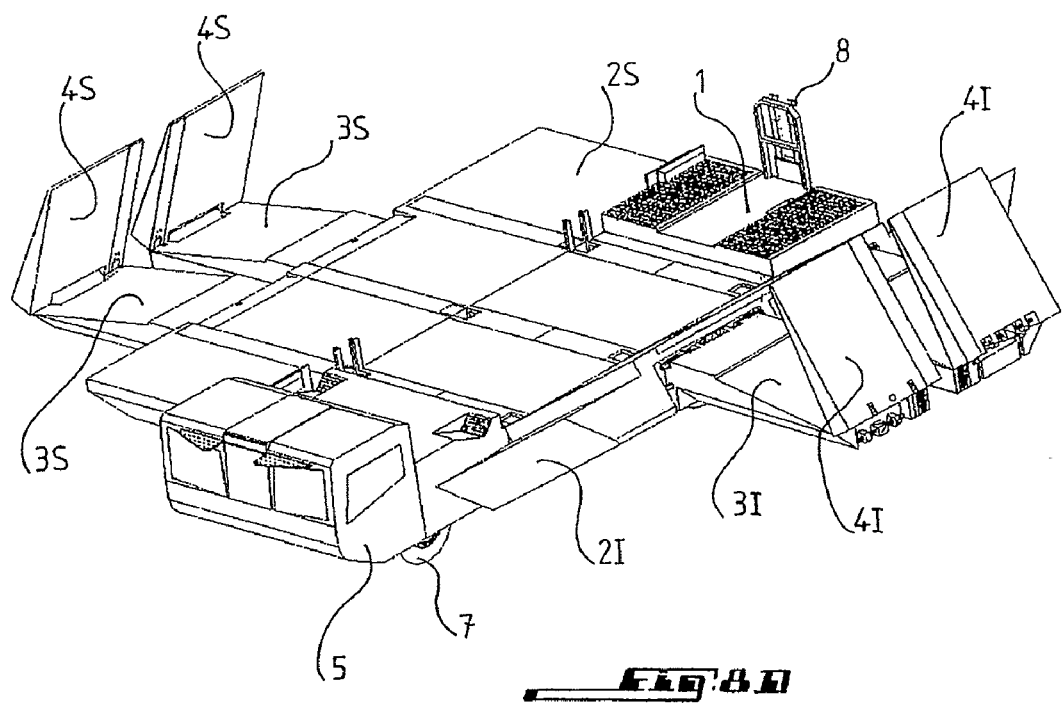

FIG. 8D illustrates the vehicle of the invention almost entirely deployed in the long mode: on the right side of the vehicle, the upper caisson 2S and the corresponding floats 3S are entirely deployed while the associated ramps 4S are still being deployed. On the other side, the lower caisson 2I and the lower floats 3I are also entirely deployed, the associated lower ramps 4I then being still deployed, but less deployed than the upper ramps 4S on the other side.

Figure 8E:
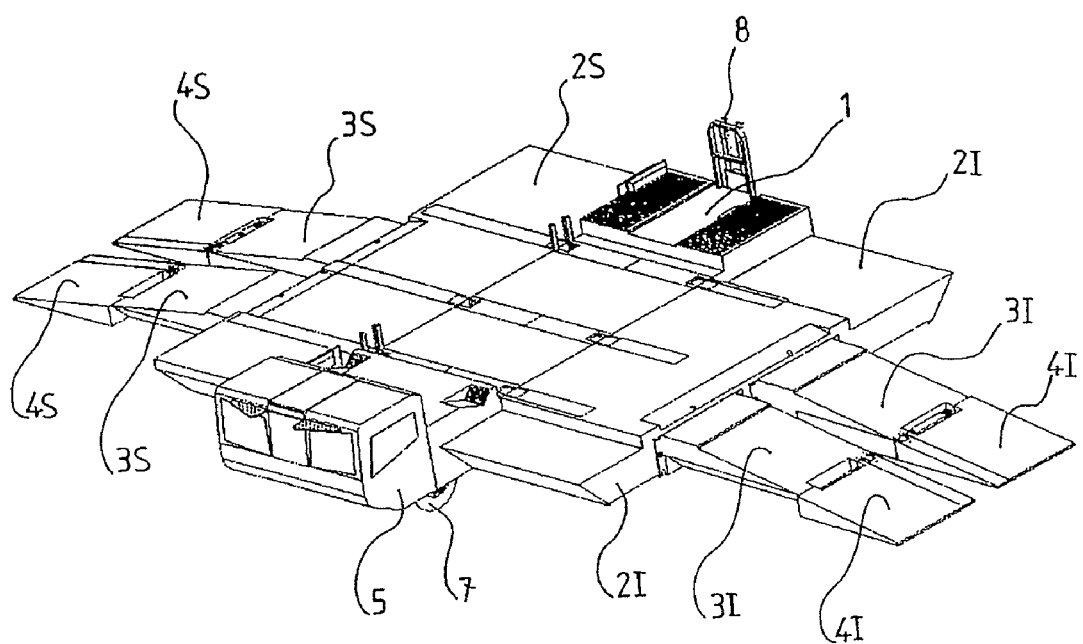

FIG. 8E finally illustrates the vehicle of the invention in its entirely long deployment condition: the upper 2S and lower 2I caissons, as well as the corresponding floats 3S and 3I just like the associated ramps 4S and 4I, are entirely deployed.

FIG. 9 illustrates the self-propelled rolling base 1 of the vehicle of the invention in a perspective view from below. In this figure, the arrangement of three axles 7 is more particularly seen, bearing here and in FIG. 10 the references 7A, 7B, 7C, including the axle 7A which is the front solitary axle, and including the two axles 7B, 7C which are positioned as tandem rear axles. FIG. 9 also illustrates the arrangement of the two aquatic propulsion means 6 and the arrangement of the transmission means 11-14 ensuring transmission of the traction force of the engine 10 to the axles 7 and to the aquatic propulsion means 6. The transmission means essentially include a transmission shaft 11 connecting the engine 10 to that of the two aquatic propulsion means 6 which is located the closest to the engine 10, a transmission shaft 12 connecting the front axle of the tandem, therefore the axle 7B, to a transfer gear box 14 which is itself connected to the front axle 7A through a transmission shaft 13. The connection between the engine 10 and both of the rear axles 7B, 7C is ensured by a gear box which is not illustrated in details in FIG. 9. Thus, the power train, to which belongs the heat engine 10, positioned in a rear transverse position, transmits mechanical energy to the three axles 7 via a mechanical transmission chain with shafts and universal joints, the transfer gear box 14 of which mounted in a central position distributes the torque of the engine according to drivability information from each wheel.

The aquatic propulsion is ensured by two aquatic propulsion means 6 which for example appear as centrifugal pumps, directly coupled to the engine via a power take-off and transmitted via the transmission shaft 11 and universal joints.

FIG. 10 illustrates the rolling base 1 of a vehicle of the invention in a perspective view from the top. This figure more particularly shows the arrangement of collectors 15 for air admission, located in the front portion of the body 1, the air being guided through tubing not shown, towards an air box located close to the power train. For cooling the engine 10, the vehicle is equipped with a cooling system of the ventilated air/water exchanger type in a closed circuit with radiators 16 positioned on the body 1 in the rear portion. FIGS. 9 and 10 also illustrate the arrangement of an exhaust 8 in the rear portion of the vehicle and raised relatively to the level of the body 1.

FIGS. 9 and 10 moreover illustrate the arrangement of control bars involved in the deployment and withdrawal of the caissons as this will be described further on, notably with reference to FIGS. 13 and 14.

FIG. 11 illustrates individually a caisson 2, two floats 3 and two ramps 4 being deployed.

FIG. 11 more particularly illustrates the arrangement of different mechanism means for deploying the floats and the ramps. Let us recall concerning this matter, that the caisson/floats/ramps assemblies form the rolling track of the vehicle, and this in continuity with the central portion of the body 1. The caissons 2 are therefore interior parts which are always deployed upon implementing a course of a pontoon. They are hinged on the body 1 via central application devices, three of which are dedicated to the lower caisson and four of which to the upper caisson.

The floats 3 are hinged on the caisson 2, they are either deployed or not during implementation by means of four actuators 17, the arrangement of which is schematically illustrated in FIG. 11. Correspondingly, the ramps 4 are hinged at the end of the floats 3. The deployment and the withdrawal of each of the ramps 4 relatively to the float 3 to which they are hinged, are carried out by means of the actuators 18.

FIG. 12 illustrates the arrangement of the whole of the deployment means of the floats and ramps. The caissons 2, floats 3 and ramps 4 are illustrated in the entirely deployed position.

FIG. 13 illustrates the body 1 with a cabin 5 of a vehicle according to the invention and the arrangement on this body 1 of control bars 19, 20 on the body 1. In FIG. 13, the upper caisson 2S and the lower caisson 2I are illustrated by frames bearing the respective references 2S, 2I.

FIG. 14 further illustrates the deployment mechanism of the caissons 2 of FIG. 13. The caissons 2 are illustrated by frames referenced as 2S for the upper caisson and 2I for the lower caisson, respectively.

Deployment of the upper caisson 2S is obtained by means of the control bar 19 which is directly hinged on the body 1 through one of its two ends and, through the other end on the upper caisson 2S via two connecting rods 23. The control bar 19 is actuated by an actuator 21 jointed on the body 1.

Analogously, the deployment of the lower caisson 2I is obtained by means of the control bar 20 which is directly hinged onto the body 1 and indirectly by means of two connecting rods 24 on the lower caisson 2I. The control bar 20 is actuated by an actuator 22 jointed on the body 1.

FIG. 15 illustrates both upper 2S and lower 2I caissons in the folded back position, i.e. one over the other. This illustration differs from those which are found for example in FIGS. 6A, 7A and 8A, by the side over which one has a glance: here, the right side of the whole of its two caissons is seen. Accordingly, upon deployment of the upper caisson 2S, the latter pivots towards the observer of FIG. 15 while the lower caisson 2I pivots towards the bottom of the image of FIG. 15. Accordingly, the upper caisson 2S, the two floats 3S and the two ramps 4S are seen in the rest or folded-back position, while in the lower portion, only the lower caisson 2I and both lower floats 3I are seen.

FIG. 16 illustrates a caisson 2 with the floats 3 and the associated ramps 4 in the folded-back condition. The arrangement of the different means of the mechanism for deploying the floats, to which belong the actuators 17, and the means of the mechanism for deploying the ramps 4, to which belong the actuators 18, are more particularly seen in this figure.

FIG. 16 moreover also shows two pivot axes respectively referenced as A and B around which the floats 3 pivot depending on their momentary deployment situation. Thus, as this is also seen in FIG. 17, the float 3 pivots around the axis A when it is deployed from the complete folded-back position towards the complete deployment position.

When the float is entirely deployed, its tilt relatively to the caisson may be varied by having it pivot around the axis B as this is also illustrated in FIG. 18. The alternate pivoting around the axis A or around the axis B, depending on the deployment level of the float, is possible by the fact that the axes A and B are disengageable elements.

FIG. 19 illustrates, in a perspective view from below, two floats 3 and two ramps 4 jointed on the floats 3. When the right ramp is entirely deployed, the left ramp is only partly deployed. FIG. 19 more particularly illustrates the actuator 18 by means of which the ramp 4 is actuated as well as a connecting rod 25 on which the actuator 18 is jointed, and control bars 26 by means of which the ramp 4 is jointed on the corresponding float 3.

FIGS. 20A-20G illustrate the deployment kinematics of two caissons 2 of a vehicle of the invention. Let us recall that both caisson/floats/ramps assemblies form in continuity with the central portion of the body 1, the rolling track of the vehicle. The caissons 2 are the interior portions of both of these assemblies and are always deployed upon implementing a ferry or a bridge. The caissons 2 are jointed on the body 1 via central implementation devices, three of which are assigned to the lower caisson 2I and four of which to the upper caisson 2S.

Each of these devices includes, as already discussed in reference with FIG. 14, an actuator 21 or 22 integrated into the structure of the body 1, a control bar 19 or 20 following the pivoting of the upper caisson or of the lower caisson and of the connecting rods 23 or 24, respectively, providing the connection between the control bar 19 or 20 and the corresponding structure of the caisson 2S or 2I.

The deployment steps illustrated in the following FIGS. 20A-20G are the following:

| FIG. 20A | Folded-back position of both caissons |
|---|---|
| FIG. 20B | Pivoting of the upper caisson |
| FIG. 20C | Upper caisson at 90° |
| FIG. 20D | Beginning of the deployment of the lower caisson |
| FIG. 20E | Lower caisson at 90° and upper caisson entirely deployed |
| FIG. 20F | Upper caisson entirely deployed and lower caisson almost entirely deployed |
| FIG. 20G | Deployed position of both caissons |

FIGS. 21A-21D illustrate a caisson 2 and two floats 3, as well as four actuators 17 by means of which the floats 3 are deployed and folded back. The floats 3 are connected to the caisson 2 through disengageable axes 30, 31 positioned along the pivot axis A or the pivot axis B, respectively.

Figure 21A:
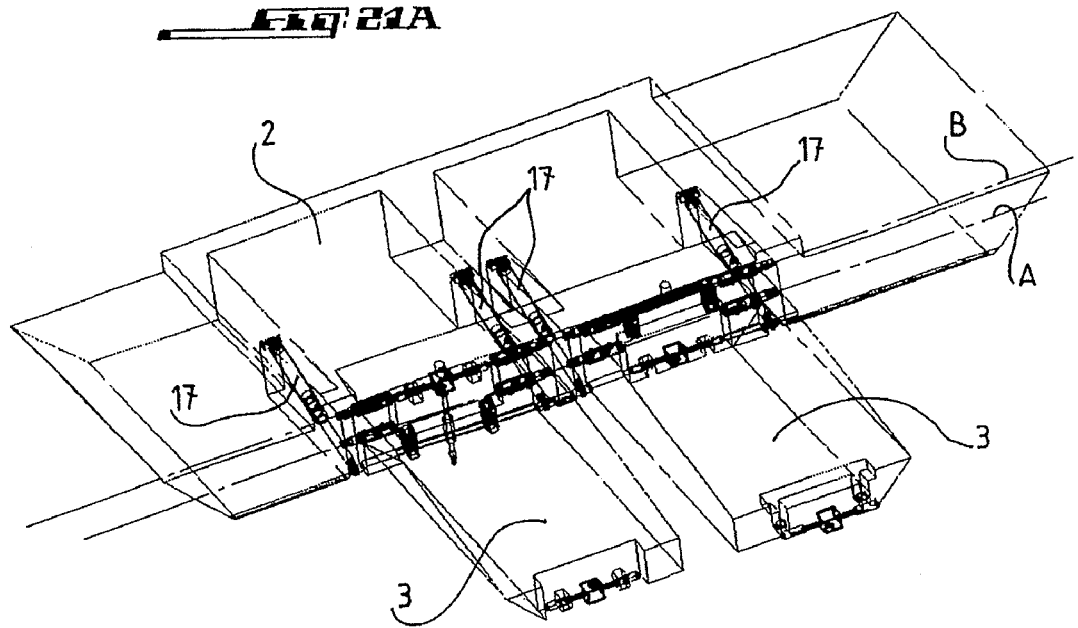
Figure 21B:
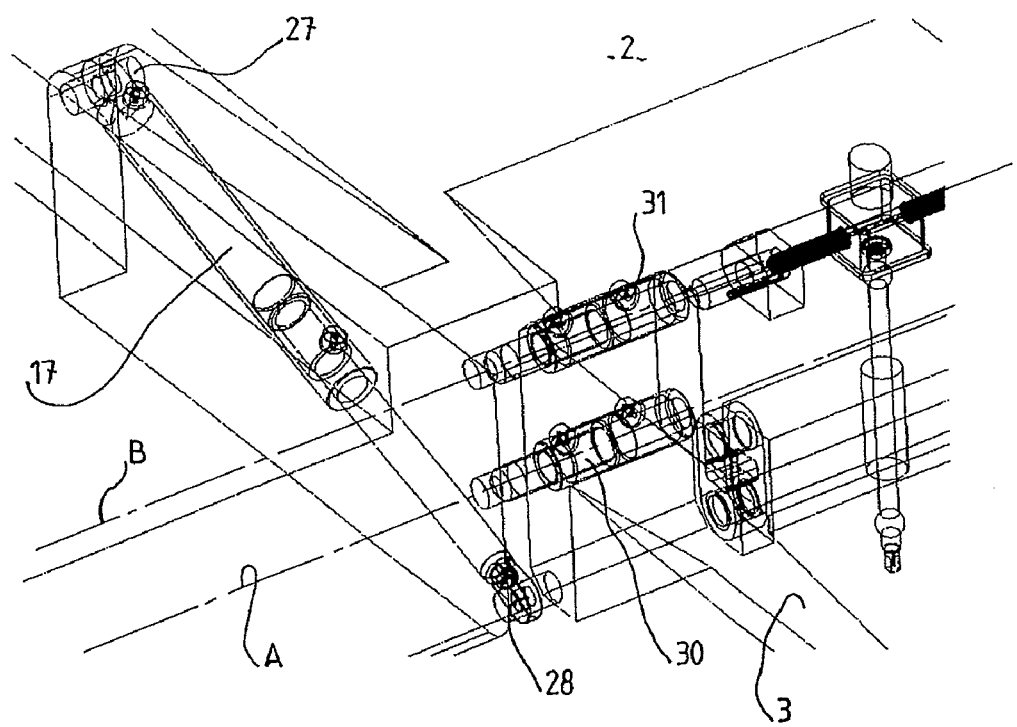

FIG. 21B illustrates details from FIG. 21A, the joints between the body 2 and each of the floats 3. The hinges of floats connecting the float to the caisson are made with detachable elements in order to allow indexing of the upper hinge, for achieving the function of raising each of the floats 3 with the associated ramp 4. Pivoting of the float 3 relatively to the caisson 2 is performed by means of the actuator 17 hinged at its end 27 on the caisson 2 and at its opposite end 28 on the float 3. A first joint between the caisson 2 and the float 3, the lower joint, is determined by a first disengageable axis 30 positioned along the pivot axis A. This joint is intended for deploying and folding back the float 3.

A second joint between the caisson 2 and the float 3, the upper joint, is determined by a second disengageable axis 31 positioned along the pivot axis B. This joint is intended for limited pivoting between the float 3 and the caisson 2 when the float 3 is entirely deployed and when the question is then to give a tilt to the float 3 and to the ramp 4 in order to bring the end of the ramp to the height of the loading or unloading bank.

The disengagement of the hinge along the axis A is carried out by disengaging the axes forming the pivot. This disengagement is carried out by an automated sliding axis mechanism actuated by an actuator with a short stroke. Once the pivot A has been disengaged and the pivot B has been disengaged, the actuator 17 no longer controls the deployment of the float 3 but the tilt of the floats 3/ramp 4 assembly.

To summarize, when the axis 30 is disengaged and the axis 31 engaged, the actuator 17 actuates the deployment of the float 3. When on the other hand the axis 30 is engaged and the axis 31 is disengaged, the actuator 17 actuates the tilting of the floats 3/ramp 4 assembly.

Figure 21C:
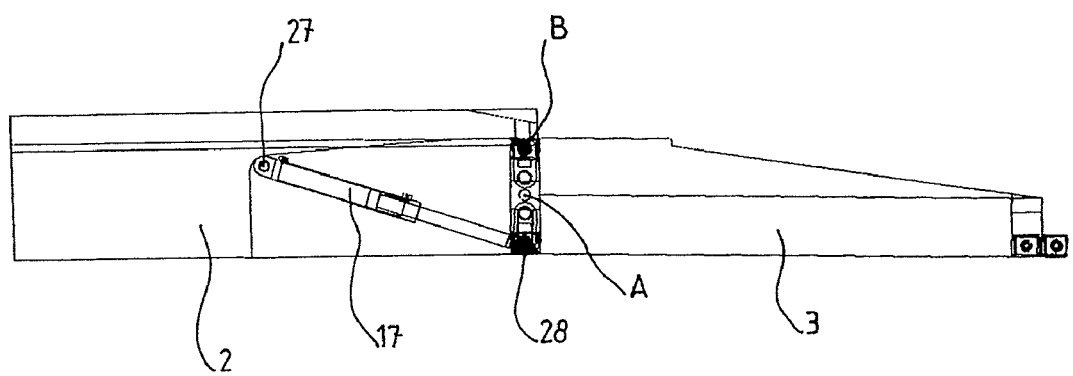
Figure 21D:
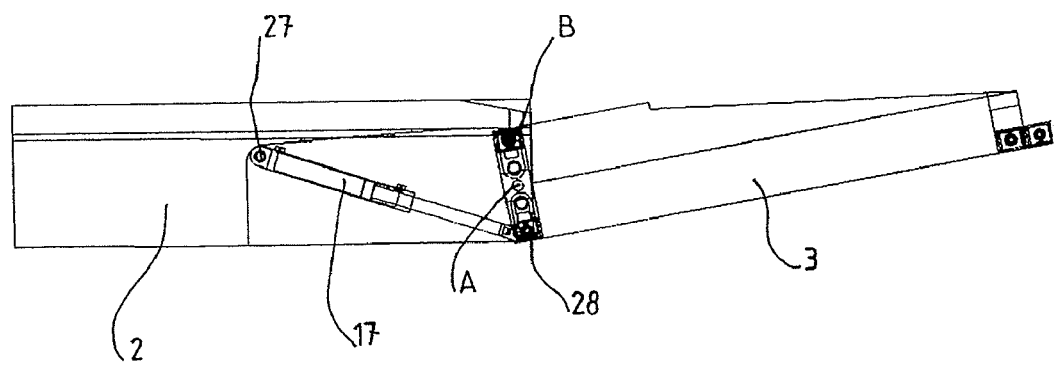

FIGS. 21C and 21D illustrate the pivoting of the float 3 relatively to the caisson 2 in side views. Thus, FIG. 21C illustrates the float 3 in the entirely deployed position relatively to the caisson and its tilt relatively to the latter. Unlike this, FIG. 21D illustrates the float 3 when it is tilted relatively to the caisson 2.

FIGS. 22A-22D illustrate in four steps the deployment of the ramps 4 relatively to the float 3. Each of the ramps 4 is jointed on a corresponding float 3 and is actuated in deployment and in folding back by means of an actuator 18.

The joint of the ramp 4 on the float 3 is achieved by a connecting rod 25 on which is jointed an actuator 18 and which itself is jointed by an axis 34 on the ramp 4 and by an axis 35 on the float 3, respectively. The actuator 18 is jointed on the connecting rod 25 to a pivot 33. The effective pivot axis of the ramp 4 relatively to the float 3 is referenced on FIGS. 22A-22D as 36.

Figure 22A:
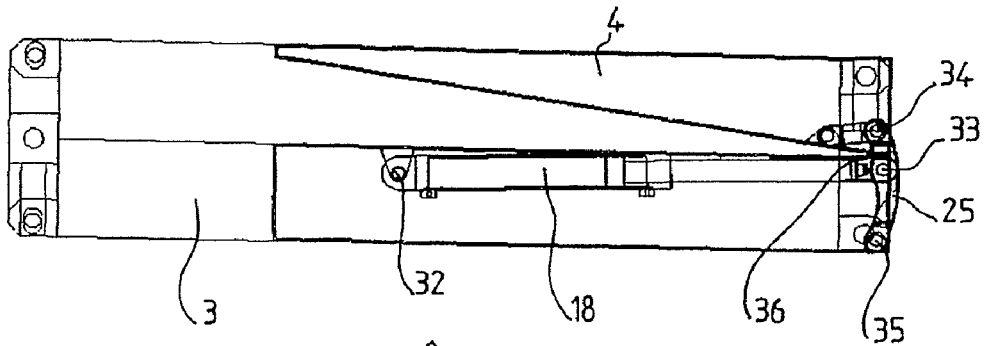
Figure 22B:
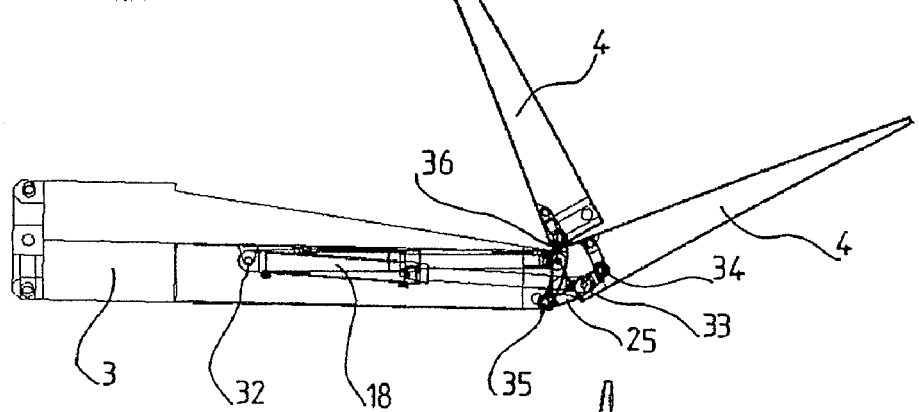
Figure 22C:
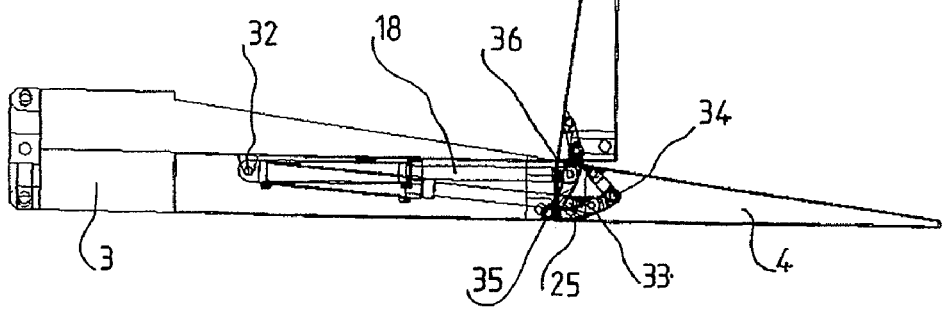
Figure 22D:
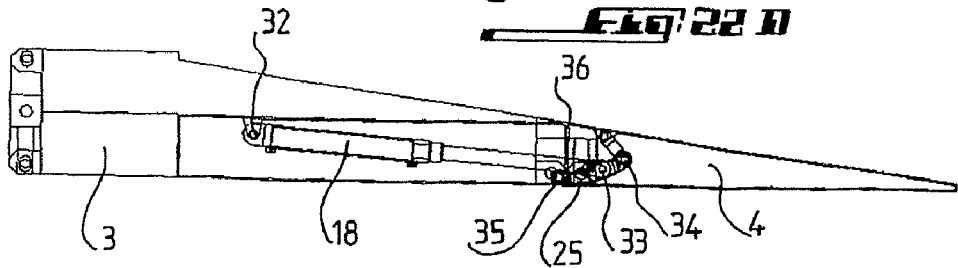

Thus, the four steps illustrated in FIGS. 22A-22D are:

| | |
|---|---|
| FIG. 22A | Ramp 4 in the folded back condition on the float 3 |
| FIG. 22B | The ramp 4 is illustrated in two successive deployment positions at less than and at more than 90° respectively, relatively to the float 3 |
| FIG. 22C | The ramp 4 is illustrated in a 90° position relatively to the float 3 and in entire deployment. |
| FIG. 22D | The ramp is illustrated in an entirely deployed condition relatively to the float 3 |

Accessorily, it will be noted that both jointed adjacent ramps on two floats on the same side of the vehicle are not necessarily deployed or folded back simultaneously, i.e. their momentary intermediate positions between the extreme conditions which are the entirely deployed positions and the entire folded back positions, are not necessarily identical. Their shift may be for example the one illustrated in FIGS. 22B and 22C, when both floats and their ramps are observed in the pivot axis.

In the folded-back position, as in the deployed position, the ramp 4 is locked relatively to the float 3 by mechanisms controlled from the cabin 5 of the vehicle of the invention. The mechanisms essentially comprise short stroke actuators and locks of the hammer or hook type.

Thus, FIGS. 23A-23C illustrate a lock of the "hammer" type intended to lock the ramp 4 in the deployed position. The hammer type lock therefore comprises as indicated by its name, a mobile hammer-shaped portion 37, with the free end of the handle of the hammer being pivotally mounted around an axis 38 positioned parallel to the connecting edge of the float 3 located facing the corresponding edge of the ramp 4. Further, the ramp 4 is provided with a housing in which a retaining element 39 is positioned, with the shape of a two-pronged fork intended to receive the head of the pivoting lock 37.

Thus, as shown in FIG. 23A, in the non-deployed and non-locked condition of the ramp 4, the lock 37 is held in a housing 40 of the float 3.

When the ramp 4 is entirely deployed, the pivoting lock 37 has left its housing 40, as shown by FIG. 23B and has pivoted towards the ramp 44. At the end of its pivoting, the pivoting lock 37 is located in a housing 41 of the ramp 4 and engaged into the fork 39.

In preparation of folding back the ramp 4 on the float 3, the locking of the ramp 4 on the float 7 is opened by pivoting the pivoting lock 37 in its initial housing 40 made in the float 3.

In the folded-back position, the ramp 4 is locked on the float 3 by means of hook type lock which comprises the following elements: a hook 42 pivotally mounted around an axis 43 of the float 3 and actuated by an actuator 44 so as to engage onto a pad 45 integral with the ramp 4 or to disengage from the latter. When the lock is actuated in order to lock or unlock the ramp, the hook 42 is pivoted by the actuator 44 pivotally mounted on the float 3. FIG. 24A illustrates the hook 42 engaged on the pad 45, the ramp 4 being then locked on the float 3 in the folded-back condition. Unlike this, FIG. 24B illustrates the hook 42 disengaged from the pad 45, the ramp 4 therefore no longer being locked on the float 3, it may therefore be deployed.

FIGS. 25-28 illustrate locking means by which two vehicles may be locked to each other by their floats, i.e. when the deployable elements of both vehicles are deployed in a half-short deployment. The locking means include a male portion and a female portion mounted on the faces of the floats intended to come into contact with the corresponding faces of the floats of another vehicle according to the invention.

The female portion, illustrated in FIG. 25, comprises, housed in a housing 50 formed in the interface of the float 3, a pivotable hook 51 conformed so as to be pivoted by the male portion, upon introducing the latter into the housing 50, in the position illustrated in FIG. 25 and in order to be pivoted, by means of a controlled lever 52, into a disengagement position releasing the male portion.

The male portion, illustrated in FIG. 27, comprises protrusively mounted on the interface of the float 3, a head 53 of a general epipedal shape with a pyramidal tip and provided with an aperture 54 into which the pivoting hook 51 engages in order to lock the male portion in the housing 50 and to thereby lock the float bearing the male portion with the float provided with the housing 50.

FIGS. 26 and 28 illustrate two floats of a vehicle according to the invention as seen from the side of the hinges which connect them to the caisson of the vehicle, and with their folded-back ramps. While the interfaces of both floats 3 illustrated in FIG. 26 are provided with locking male and female portions, the interfaces of the floats illustrated in FIG. 28 are only provided with locking female portions.

The invention claimed is:
1. An amphibious vehicle including:
    a self-propelled rolling base having wheels on an underside of the vehicle for driving the vehicle on firm ground along a longitudinal axis of the vehicle;
    first and second hinged assemblies that may be folded and unfolded, each hinged assembly including a caisson, a float, and a ramp successively hingedly connected to each other, in that order, so that the caisson, the float, and the ramp can be stored in a Z-shaped configuration, with the caissons hingedly connected to the self-propelled rolling base, the first hinged assembly, when folded in the Z-shaped configuration, being stored on a top side of the self-propelled rolling base, and the second hinged assembly, when folded in the Z-shaped configuration, being stored on top of the first hinged assembly, wherein the first and second hinged assemblies are deployed by being partially or fully unfolded in directions transverse to the longitudinal axis of the vehicle for bridging a depression into which the vehicle is driven; and
    a deployment device deploying the second hinged assembly on a first side of the rolling base before beginning to deploy the first hinged assembly on a second side of the rolling base, and deploying the first and second hinged assemblies in a plurality of deployment configurations, wherein, in a first deployment configuration, the caissons are unfolded from and are transverse to the longitudinal axis of the vehicle, and the floats and the ramps are folded and underneath the respective caissons, facing in the same direction as the underside of the vehicle.

2. The amphibious vehicle according to claim 1, comprising, on the floats, locking elements for locking the amphibious vehicle to another amphibious vehicle.

3. The amphibious vehicle according to claim 2, wherein the locking elements are positioned symmetrically on each float.

4. The amphibious vehicle according to claim 2, wherein the locking elements include, on each float, male locks and female locks.

5. The amphibious vehicle according to claim 1, wherein
each of the ramps and floats of each of the first and second hinged assemblies includes an actuator and selectively engageable and disengageable hinges, and
the actuator selectively controls deployment of the (i) the float of the corresponding first and second hinged assembly, and (ii), in combination, the ramp and the float of the corresponding first and second hinged assembly, depending upon engagement and disengagement of the selectively engageable and disengageable hinges.

6. The amphibious vehicle according to claim 1, wherein the deployment device deploys the first and second assemblies in a second deployment configuration in which the caissons are unfolded from and are transverse to the longitudinal axis of the vehicle, the float and the ramp of the first hinged assembly are unfolded, with the float extending outwardly with respect to the vehicle from the corresponding caisson and the ramp extending outwardly with respect to the vehicle from the corresponding float, and the float and the ramp of the second hinged assembly are folded and underneath the corresponding caisson, facing in the same direction as the underside of the vehicle.

7. The amphibious vehicle according to claim 6, wherein the deployment device deploys the first and second assemblies in a third deployment configuration in which the caissons are unfolded from and are transverse to the longitudinal axis of the vehicle, and the floats and the ramps of the first and second hinged assembly are unfolded, with each float extending outwardly with respect to the vehicle from the corresponding caisson, and each ramp extending outwardly with respect to the vehicle from the corresponding float.

8. A vehicular structure for bridging a depression, the vehicular structure including:
first and second amphibious vehicles linked to each other, wherein each amphibious vehicle includes
a self-propelled rolling base having wheels on an underside of the vehicle for driving the vehicle on firm ground along a longitudinal axis of the vehicle;
first and second hinged assemblies that may be folded and unfolded, each hinged assembly including a caisson, a float, and a ramp successively hingedly connected to each other, in that order, so that the caisson, the float, and the ramp can be stored in a Z-shaped configuration, with the caissons hingedly connected to the self-propelled rolling base, the first hinged assembly, when folded in the Z-shaped configuration, being stored on a top side of the self-propelled rolling base, and the second hinged assembly, when folded in the Z-shaped configuration, being stored on top of the first hinged assembly, wherein the first and second hinged assemblies are deployed by being partially or fully unfolded in directions transverse to the longitudinal axis of the vehicle for bridging the depression; and
a deployment device deploying the second hinged assembly on a first side of the rolling base before beginning to deploy the first hinged assembly on a second side of the rolling base, and deploying the first and second hinged assemblies in a plurality of deployment configurations, wherein,
in a first deployment configuration, the caissons are unfolded from and are transverse to the longitudinal axis of the vehicle, the float and the ramp of the first hinged assembly are unfolded, with the float extending outwardly with respect to the vehicle from the corresponding caisson and the ramp extending outwardly with respect to the vehicle from the corresponding float, and the float and the ramp of the second hinged assembly are folded and underneath the corresponding caisson, facing in the same direction as the underside of the vehicle, and
the first and second vehicles linked together are deployed in the first deployment configuration and are linked at respective floats on sides of the first and second vehicles at which the respective ramps are folded and underneath the ramps that are linked.

9. The vehicular structure according to claim 8, comprising, on the floats, locking elements locking the two amphibious vehicles together.

10. The vehicular structure according to claim 9, wherein the locking elements are positioned symmetrically on each float.

11. The vehicular structure according to claim 9, wherein the locking elements include, on each float, male locks and female locks.

12. The vehicular structure according to claim 8, wherein
each of the ramps and floats of each of the first and second hinged assemblies includes an actuator and selectively engageable and disengageable hinges, and
the actuator selectively controls deployment of the (i) the float of the corresponding first and second hinged assembly, and (ii), in combination, the ramp and the float of the corresponding first and second hinged assembly, depending upon engagement and disengagement of the selectively engageable and disengageable hinges.

* * * * *

UNITED STATES PATENT AND TRADEMARK OFFICE
CERTIFICATE OF CORRECTION

PATENT NO.         : 8,382,539 B2                                       Page 1 of 1
APPLICATION NO.    : 12/526976
DATED              : February 26, 2013
INVENTOR(S)        : Richeux et al.

It is certified that error appears in the above-identified patent and that said Letters Patent is hereby corrected as shown below:

On the Title Page

Change;

Item (22) PCT Filed:    Feb. 2, 2007 to

Item (22) PCT Filed:    Feb. 27, 2007

Signed and Sealed this
Sixteenth Day of April, 2013

Teresa Stanek Rea
*Acting Director of the United States Patent and Trademark Office*